United States Patent
Abali et al.

(10) Patent No.: US 10,824,953 B2
(45) Date of Patent: *Nov. 3, 2020

(54) RECONFIGURABLE ARRAY PROCESSOR FOR PATTERN MATCHING

(71) Applicant: International Business Machines Corporation, Armonk, NY (US)

(72) Inventors: Bulent Abali, Tenafly, NJ (US); Ganesh Balakrishnan, Apex, NC (US); Bartholomew Blaner, Underhill Center, VT (US); Peter A. Sandon, Essex Junction, VT (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 516 days.

This patent is subject to a terminal disclaimer.

(21) Appl. No.: 14/602,059

(22) Filed: Jan. 21, 2015

(65) Prior Publication Data

US 2016/0085721 A1    Mar. 24, 2016

Related U.S. Application Data

(63) Continuation of application No. 14/492,827, filed on Sep. 22, 2014.

(51) Int. Cl.
*G06N 5/04* (2006.01)
*G06F 9/30* (2018.01)
*G06K 9/00* (2006.01)

(52) U.S. Cl.
CPC ........... *G06N 5/047* (2013.01); *G06F 9/3001* (2013.01); *G06F 9/30021* (2013.01);
(Continued)

(58) Field of Classification Search
None
See application file for complete search history.

(56) References Cited

U.S. PATENT DOCUMENTS 4,551,814 A * 11/1985 Moore ............. H03K 19/17708
326/10
4,551,815 A * 11/1985 Moore ................. H03K 19/003
326/13
(Continued)

OTHER PUBLICATIONS

"U.S. Appl. No. 14/492,827 FAI—Office Action Summary", dated Mar. 30, 2017, 16 pages.
(Continued)

*Primary Examiner* — George Giroux
(74) *Attorney, Agent, or Firm* — Nathan M. Rau

(57) ABSTRACT

Various implementations of a method, system, and computer program product for pattern matching using a reconfigurable array processor are disclosed. In one embodiment, a processor array manager of the reconfigurable array processor receives an input data stream for pattern matching and generates a tokenized input data stream from the input data stream. A different portion of the tokenized input data stream is provided to each of a plurality of processing elements of the reconfigurable array processor. Each processing element can compare the received portion of the tokenized input data stream against one or more reference patterns to generate an intermediate result that indicates whether the portion of the tokenized input data stream matches a reference pattern. The processor array manager can combine the intermediate results received from each processing element to yield a final result that indicates whether the input data stream includes a reference pattern.

20 Claims, 11 Drawing Sheets

(52) U.S. Cl.
CPC ........... *G06F 9/30036* (2013.01); *G06K 9/00* (2013.01); *G06K 9/00973* (2013.01)

(56) References Cited

U.S. PATENT DOCUMENTS

| | | | | |
|---|---|---|---|---|
| 4,722,084 | A * | 1/1988 | Morton | G11C 29/006 714/3 |
| 4,939,642 | A | 7/1990 | Blank | |
| 4,939,727 | A | 7/1990 | Gianola et al. | |
| 5,525,982 | A * | 6/1996 | Cheng | H03M 7/3086 341/106 |
| 6,131,092 | A | 10/2000 | Masand | |
| 6,721,789 | B1 | 4/2004 | Demoney | |
| 9,934,030 | B2 | 4/2018 | Balakrishnan et al. | |
| 2004/0049672 | A1 | 3/2004 | Nollet et al. | |
| 2004/0264696 | A1 * | 12/2004 | Cockburn | H03M 7/3084 380/200 |
| 2007/0022414 | A1 * | 1/2007 | Bird | G06F 8/427 717/143 |
| 2007/0113171 | A1 * | 5/2007 | Behrens | G06F 15/7842 715/239 |
| 2007/0239752 | A1 * | 10/2007 | Beitman | G06F 7/02 |
| 2007/0260602 | A1 * | 11/2007 | Taylor | G06F 19/22 |
| 2007/0276806 | A1 * | 11/2007 | Tan | G06K 9/38 |
| 2008/0047008 | A1 | 2/2008 | Cho et al. | |
| 2008/0168465 | A1 | 7/2008 | Tanaka | |
| 2008/0181489 | A1 | 7/2008 | Fu et al. | |
| 2009/0070459 | A1 * | 3/2009 | Cho | H04L 63/1416 709/224 |
| 2009/0158427 | A1 * | 6/2009 | Kim | G06F 16/90344 726/22 |
| 2009/0234852 | A1 * | 9/2009 | Mola | G06F 7/02 |
| 2010/0037213 | A1 * | 2/2010 | Meijer | G06F 8/427 717/144 |
| 2013/0232166 | A1 | 9/2013 | Tan | |
| 2013/0246377 | A1 * | 9/2013 | Gaitonde | H04L 63/0236 707/697 |
| 2014/0156790 | A1 * | 6/2014 | Gopal | H03M 7/3086 709/217 |
| 2014/0201229 | A1 | 7/2014 | Kirazci et al. | |
| 2016/0085721 | A1 | 3/2016 | Abali et al. | |
| 2018/0060070 | A1 | 3/2018 | Balakrishnan et al. | |
| 2019/0012169 | A1 | 1/2019 | Balakrishnan et al. | |

OTHER PUBLICATIONS

"U.S. Appl. No. 14/530,027 FAI Office Action", dated Jun. 6, 2017, 6 pages.

"U.S. Appl. No. 14/530,027 FAI—PreInterview Summary", dated Mar. 23, 2017, 7 pages.

"U.S. Appl. No. 14/729,281 FAI—PreInterview Summary", dated Mar. 23, 2017, 7 pages.

Lin, "Multiplexers and Demultiplexers", Retrieved from URL: www.cs.umd.edu/class/sum2003/cmsc311/Notes/Comb/mux.html, Nov. 30, 2004, 11 pages.

"U.S. Appl. No. 14/729,281 FAI Office Action", dated Jun. 6, 2017, 6 pages.

Koch, et al., "FPGASort: A High Performance Sorting Architecture Exploiting Run-time Reconfiguration on FPGAs for Large Problem Sorting", 2011, 10 pages.

Marcelino, et al., "Sorting Units for FPGA-Based Embedded Systems", 2008, 13 pages.

Pramanik, et al., "A Hardware Pattern Matching Algorithm on a Dataflow", 1985, 6 pages.

Yadav, et al., "Hardware Architecture of a Parallel Pattern Matching Engine", 2007, 4 Pages.

"U.S. Appl. No. 14/492,827 FAI—PreInterview Summary", dated Oct. 6, 2016, 5 pages.

"U.S. Appl. No. 14/492,827 Final Office Action", dated Jul. 13, 2017, 16 pages.

"U.S. Appl. No. 14/492,827 Office Action", dated Feb. 12, 2018, 14 pages.

"U.S. Appl. No. 14/492,827 Final Office Action", dated Jul. 11, 2018, 15 pages.

"U.S. Appl. No. 14/492,827 Office Action", dated May 3, 2019, 14 pages.

* cited by examiner

600 →

| ascii coding | | char | token coding | | | | | class | ambig |
|---|---|---|---|---|---|---|---|---|---|
| 00x | xxxx | cntl | 0 | 0 | 0 | 0 | 0000 | nomatch | |
| 010 | 0000 | sp | 1 | 0 | 0 | 0 | 0000 | delimit1 | |
| | 0001 | ! | 0 | 0 | 0 | 0 | 0001 | other1 | |
| | ... | | | | | | | | |
| | 1100 | , | 0 | 0 | 0 | 0 | 1100 | other1 | |
| | 1101 | - | 1 | 0 | 0 | 0 | 1101 | delimit1 | |
| | 1110 | . | 1 | 0 | 0 | 0 | 1110 | delimit1 | |
| | 1111 | / | 0 | 0 | 0 | 0 | 1111 | other1 | |
| 011 | 0000 | 0 | 0 | 0 | 1 | 1 | 0000 | digit | |
| | ... | | | | | | | | |
| | 1001 | 9 | 0 | 0 | 1 | 1 | 1001 | digit | |
| | 1010 | : | 0 | 0 | 0 | 1 | 1010 | other2 | |
| | ... | | | | | | | | |
| | 1111 | ? | 0 | 0 | 0 | 1 | 1111 | other2 | |
| 100 | 0000 | @ | 1 | 1 | 0 | 0 | 0000 | delimit2 | ` |
| | 0001 | A | 1 | 1 | 1 | 0 | 0001 | alpha | a |
| | ... | | | | | | | | |
| | 1111 | O | 1 | 1 | 1 | 0 | 1111 | alpha | o |
| 101 | 0000 | P | 1 | 1 | 1 | 1 | 0000 | alpha | p |
| | ... | | | | | | | | |
| | 1010 | Z | 1 | 1 | 1 | 1 | 1010 | alpha | z |
| | 1011 | [ | 0 | 1 | 0 | 1 | 1011 | other3 | { |
| | 1100 | \ | 0 | 1 | 0 | 1 | 1100 | other3 | | |
| | 1101 | ] | 0 | 1 | 0 | 1 | 1101 | other3 | } |
| | 1110 | ^ | 0 | 1 | 0 | 1 | 1110 | other3 | ~ |
| | 1111 | _ | 1 | 1 | 1 | 1 | 1111 | alpha | |
| 110 | 0000 | ` | 1 | 1 | 0 | 0 | 0000 | delimit2 | @ |
| | 0001 | a | 1 | 1 | 1 | 0 | 0001 | alpha | A |
| | ... | | | | | | | | |
| | 1111 | o | 1 | 1 | 1 | 0 | 1111 | alpha | O |
| 111 | 0000 | p | 1 | 1 | 1 | 1 | 0000 | alpha | P |
| | ... | | | | | | | | |
| | 1010 | z | 1 | 1 | 1 | 1 | 1010 | alpha | Z |
| | 1011 | { | 0 | 1 | 0 | 1 | 1011 | other3 | [ |
| | 1100 | | | 0 | 1 | 0 | 1 | 1100 | other3 | \ |
| | 1101 | } | 0 | 1 | 0 | 1 | 1101 | other3 | ] |
| | 1110 | ~ | 0 | 1 | 0 | 1 | 1110 | other3 | ^ |
| | 1111 | DEL | 0 | 0 | 0 | 0 | 0000 | nomatch | |

FIG. 6

RECONFIGURABLE ARRAY PROCESSOR FOR PATTERN MATCHING

RELATED APPLICATIONS

This application is a Continuation of and claims the priority benefit of U.S. application Ser. No. 14/492,827 filed Sep. 22, 2014.

BACKGROUND

Embodiments of the inventive subject matter generally relate to the field of computing, and, more particularly, to a reconfigurable array processor for pattern matching.

Pattern matching may include comparing input data against a reference pattern to determine whether the input data includes the reference pattern. Pattern matching may be used in analytics, search, security, and other applications.

SUMMARY

In one embodiment, an input data stream is received at a processor array manager of a reconfigurable array processor for pattern matching. A tokenized input data stream is generated from the input data stream. A different portion of the tokenized input data stream is provided to each of a plurality of processing elements of the reconfigurable array processor. An intermediate result is received from each processing element based, at least in part, on the processing element comparing the portion of the tokenized input data stream against a reference pattern, wherein the intermediate result indicates whether the portion of the tokenized input data stream matches the reference pattern. The intermediate results received from each processing element are combined to yield a final result that indicates whether the input data stream includes the reference pattern.

BRIEF DESCRIPTION OF THE DRAWINGS

The present embodiments may be better understood, and numerous objects, features, and advantages made apparent to those skilled in the art by referencing the accompanying drawings.

FIG. 6 illustrates an example table for data tokenization.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. Although examples describe the reconfigurable array processor including 16 processing elements where each processing element operates on 16 bytes of data for pattern matching, embodiments are not so limited. In other embodiments, the reconfigurable array processor can include other suitable number of processing elements where each processing element can operate on the same or different amounts of data. In other instances, well-known instruction instances, protocols, structures, and techniques have not been shown in detail in order not to obfuscate the description.

A reconfigurable array processor can be implemented for parallel pattern matching of streaming data. The reconfigurable array processor may include a processor array manager and a reconfigurable array of interconnected processing elements. Each processing element may operate, in parallel, on different portions of an input data stream. The functionality of the processing elements and the interconnections between the processing elements can be configured depending on the type of operations to be executed by the reconfigurable array processor. As will be further described herein, the functionality of the processing elements and the interconnections between the processing elements can be configured for pattern matching. The processor array manager can tokenize an input data stream and provide different portions of the tokenized input data stream to each processing element. Each processing element can execute pattern matching operations on the corresponding portion of the tokenized input data stream and generate a result that indicates whether the portion of the tokenized input data stream matches a reference pattern. The processor array manager can combine individual results received from each processing element to determine whether the input data stream includes a reference pattern. In one example, the reconfigurable array processor may search for sensitive data in an input data stream for cybersecurity. The reconfigurable array processor may execute pattern matching operations to determine whether an application is using sensitive data and if so, to take appropriate measures (e.g., determine whether the application is authorized to use the data, implementing additional levels of encryption, etc.). The reconfigurable array processor efficiently performs pattern matching that is configured to optimize source data tokenization, pattern matching operations, and results data packing.

Figure 1:
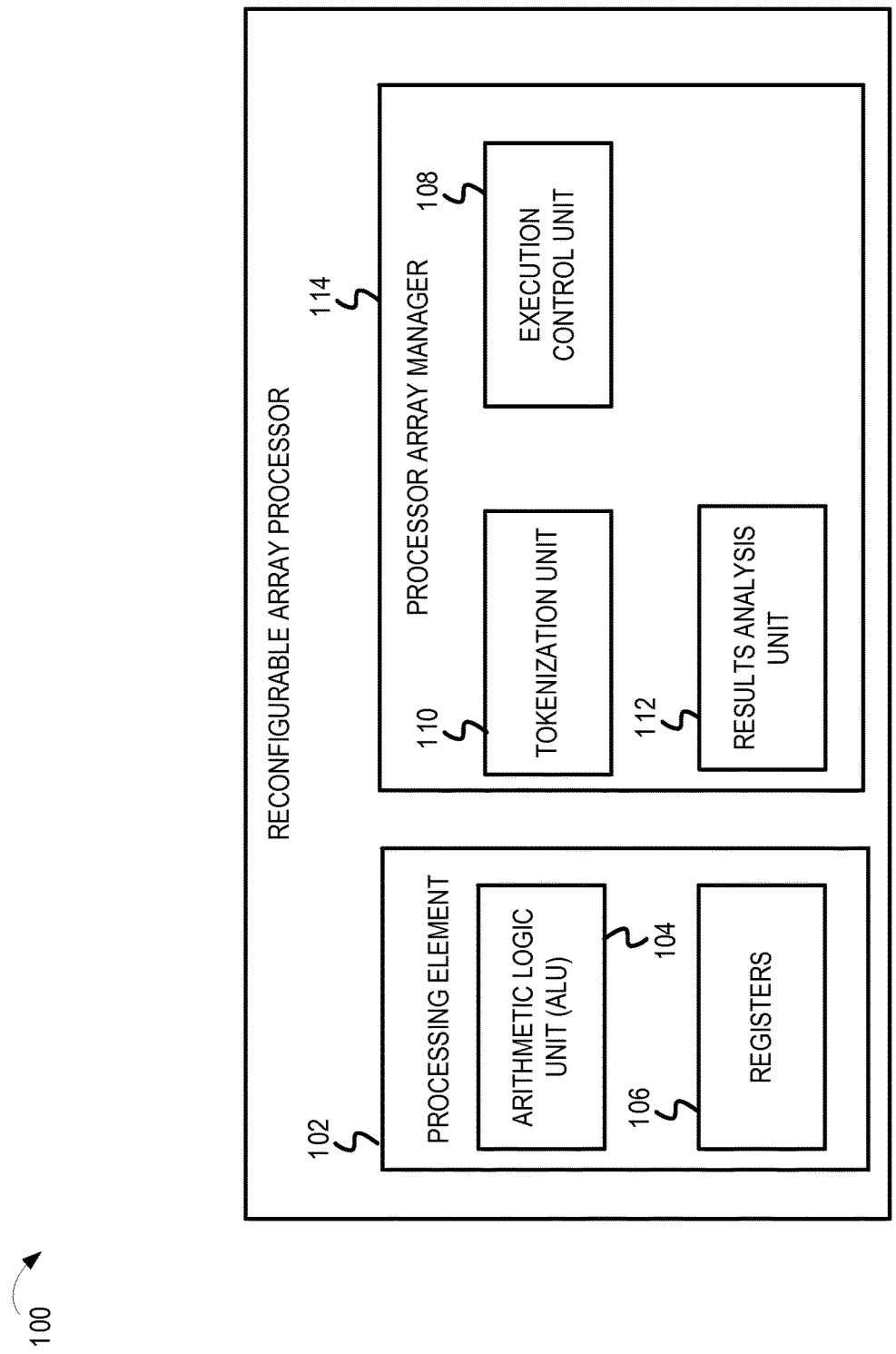
FIG. 1 is a block diagram illustrating one example of a reconfigurable array processor for pattern matching.

FIG. 1 is a block diagram illustrating one example of a reconfigurable array processor 100 for pattern matching. The reconfigurable array processor 100 includes a processing element 102 and a processor array manager 114. The processing element 102 includes an arithmetic logic unit (ALU) 104 and registers 106. FIG. 1 depicts the reconfigurable array processor 100 including one processing element for simplicity. However, the reconfigurable array processor 100 may include any suitable number of interconnected processing elements, as depicted with reference to FIG. 2. The processor array manager 114 includes an execution control unit 108, a tokenization unit 110, and a results analysis unit 112. The registers 106 may include one or more reference patterns for pattern matching. The processing element 102 can execute operations in conjunction with the processor array manager 114 to determine whether an input data stream matches any of the reference patterns. The tokenization unit 110 can generate a tokenized input data stream from an input data stream and provide a different portion of the tokenized input data stream to each processing element 102. The processing element 102 (e.g., the ALU 104) can compare the portion of the tokenized input data stream against the reference patterns. The processing element 102 can generate an intermediate result that indicates whether the portion of the tokenized input data stream matches a reference pattern. The results analysis unit 112 can receive an intermediate result from each processing element and can combine the intermediate results to form a final result. The final result can indicate whether the input data stream matches any of the reference patterns.

Figure 2:
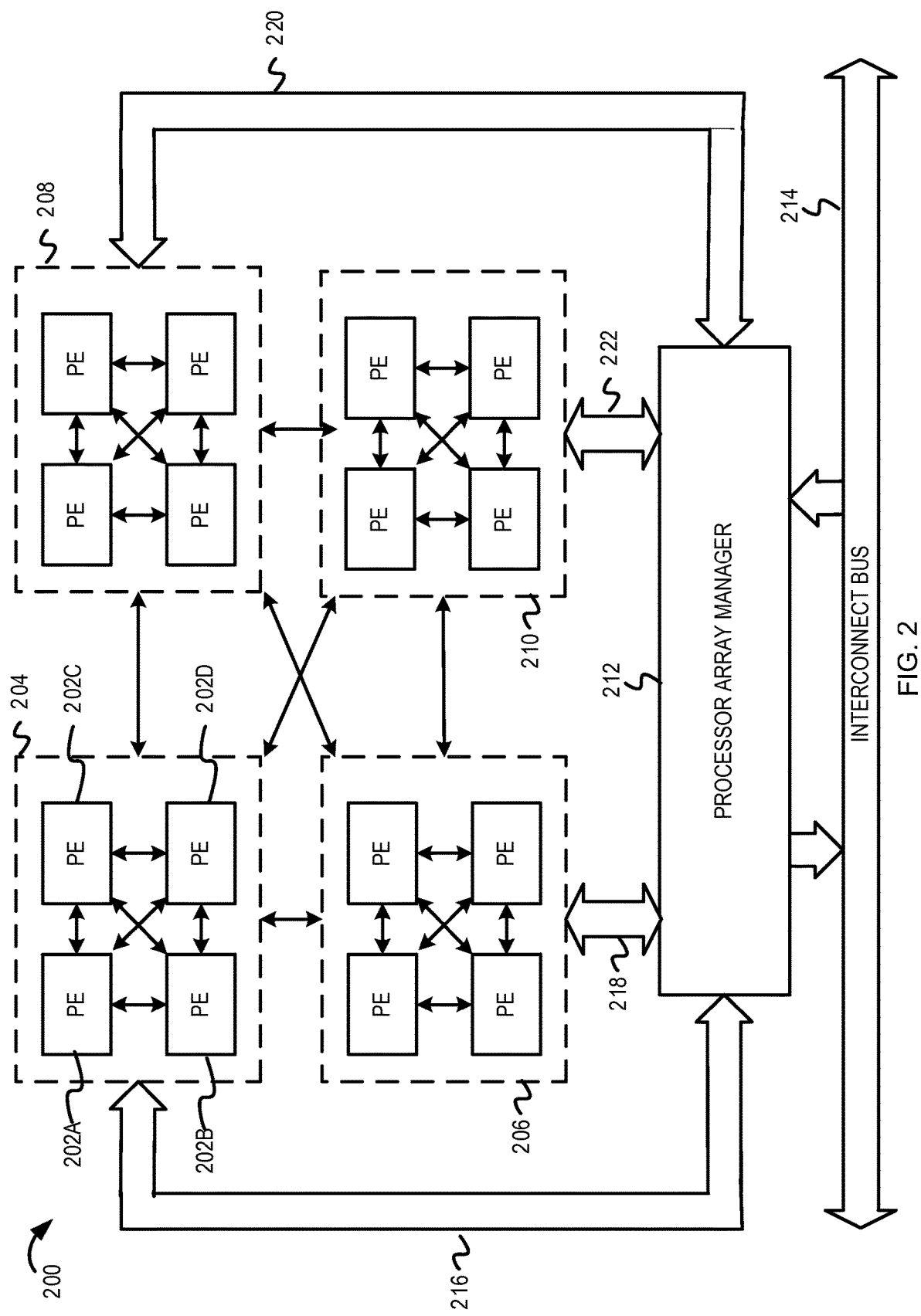
FIG. 2 is a block diagram of a reconfigurable array processor including example interconnections between processing elements.

The configuration and interconnection of the processing elements in the reconfigurable array processor may vary depending on the type of application, as will be further described in FIG. 2. The execution control unit 108 can control the interconnections between processing elements for pattern matching, initialize the registers 106, and provide a set of instructions for pattern matching to the processing elements 102 and other components of the processor array manager 114. For example, the execution control unit 108 may disable those components of the processing element 102 and/or the processor array manager 114 that are not needed for pattern matching. Operations of the processing element 102 will be further described with reference to FIGS. 2-4 and 10. Operations of the processor array manager 114 will be further described with reference to FIGS. 5-9.

FIG. 2 is one example of a reconfigurable array processor 200 including interconnections between processing elements. The reconfigurable array processor 200 includes 16 processing elements (PE) 202, a processor array manager 212, and an interconnect bus 214. A subset of the processing elements may be grouped together to form a processing element cluster ("PE cluster"). In FIG. 2, dashed lines are used to represent the group of processing elements that belong to the same PE cluster. In FIG. 2, the processing elements of the reconfigurable array processor 200 are divided into four PE clusters 204, 206, 208, and 210, each PE cluster including four processing elements. For example, processing elements 202A, 202B, 202C, and 202D are part of the PE cluster 204. In one implementation, the processing elements within a PE cluster may be "fully interconnected" with each other. In other words, as depicted in FIG. 2, each of the processing elements 202A, 202B, 202C, and 202D of the PE cluster 204 may be connected with every other processing element of the PE cluster 204. Additionally, in some implementations, each PE cluster of the reconfigurable array processor 200 may be interconnected with every other PE cluster of the reconfigurable array processor 200. For example, as depicted in FIG. 2, the PE clusters 204, 206, 208, and 210 may be fully interconnected. However, in other implementations, the reconfigurable array processor 200 may include other suitable number of PE clusters and/or other suitable number of processing elements per PE cluster. Furthermore, in other implementations, the interconnections between processing elements within a particular PE cluster and the interconnections between PE clusters may be programmable. For example, within the PE cluster 204, the processing elements 202A, 202B, and 202D may not be connected to each other. As another example, the PE clusters 206 and 208 may not be connected to each other. More generally, the PE clusters and/or the processing elements within a particular PE cluster may be interconnected in any suitable manner depending on the application of the reconfigurable array processor 200. For example, the processing elements and/or the PE clusters may be interconnected in a first mode for the pattern matching application. As another example, the processing elements and/or the PE clusters may be interconnected in a second mode for a hashing application.

In some embodiments, the PE clusters 204, 206, 208, and 210 may each be coupled with the processor array manager 212 via load/store data buses 216, 218, 220, and 222 respectively. A processing element of a PE cluster may receive input data for processing, and may provide corresponding results to the processor array manager 212 via the load/store data bus. In some embodiments, each PE cluster may include a PE cluster manager that receives the input data via the load/store data bus and distributes the input data to each processing element of the PE cluster. The PE cluster manager may also receive the results generated by each processing element of the PE cluster and provide the results to the processor array manager 212. In other embodiments, each processing element may be coupled with the processor array manager 212 via a load/store data bus. The processing element may receive the input data from the processor array manager 212, and may provide the result to the processor array manager 212 via the load/store bus and without intervention by a PE cluster manager. The interconnect bus 214 may be an on-chip bus that couples the processor array manager 212 to on-chip memory or off-chip memory. The processor array manager 212 may receive the input data (to be provided to the processing elements) from memory via the interconnect bus 214. The processor array manager 212 may store the results (received from the processing elements) to memory via the interconnect bus 214.

Referring back to FIG. 1, the execution control unit 108 may receive an indication of a program (e.g., set of instructions) that should be executed by the reconfigurable array processor 100. For example, the execution control unit 108 may receive a command from a central processor of an electronic device that includes the reconfigurable array processor 100. The command may include a program address that indicates where the program is stored in memory. The execution control unit 108 may fetch the program and load the program into the processor array manager 114 and the processing elements 102 for subsequent execution. In some embodiments, the program may be tailored to the number of processing elements, the number of PE clusters, and/or the number of processing elements per PE cluster in the reconfigurable array processor 100. The program can also indicate how the processing elements and/or PE clusters should be interconnected for the corresponding application. For example, a pattern matching program may identify the processing elements and/or PE clusters should be enabled for pattern matching. The pattern matching program may also indicate which interconnections between the processing elements and/or between PE clusters should be enabled. The interconnections between the processing elements and/or between PE clusters can help control the flow of operands to the processing elements and the flow of results generated by the processing elements. The operands may be sourced from memory or may be constants that are programmed in each processing element. The program may include (or indicate an address from which to retrieve) a micro-program that should be executed by each of the processing elements for pattern matching. The pattern matching program may also indicate a source address from which input data should be accessed and a destination address to which output data (e.g., results) should be stored. The pattern matching program may also identify values (e.g., reference patterns, etc.) that should be stored in each processing element.

Figure 3:
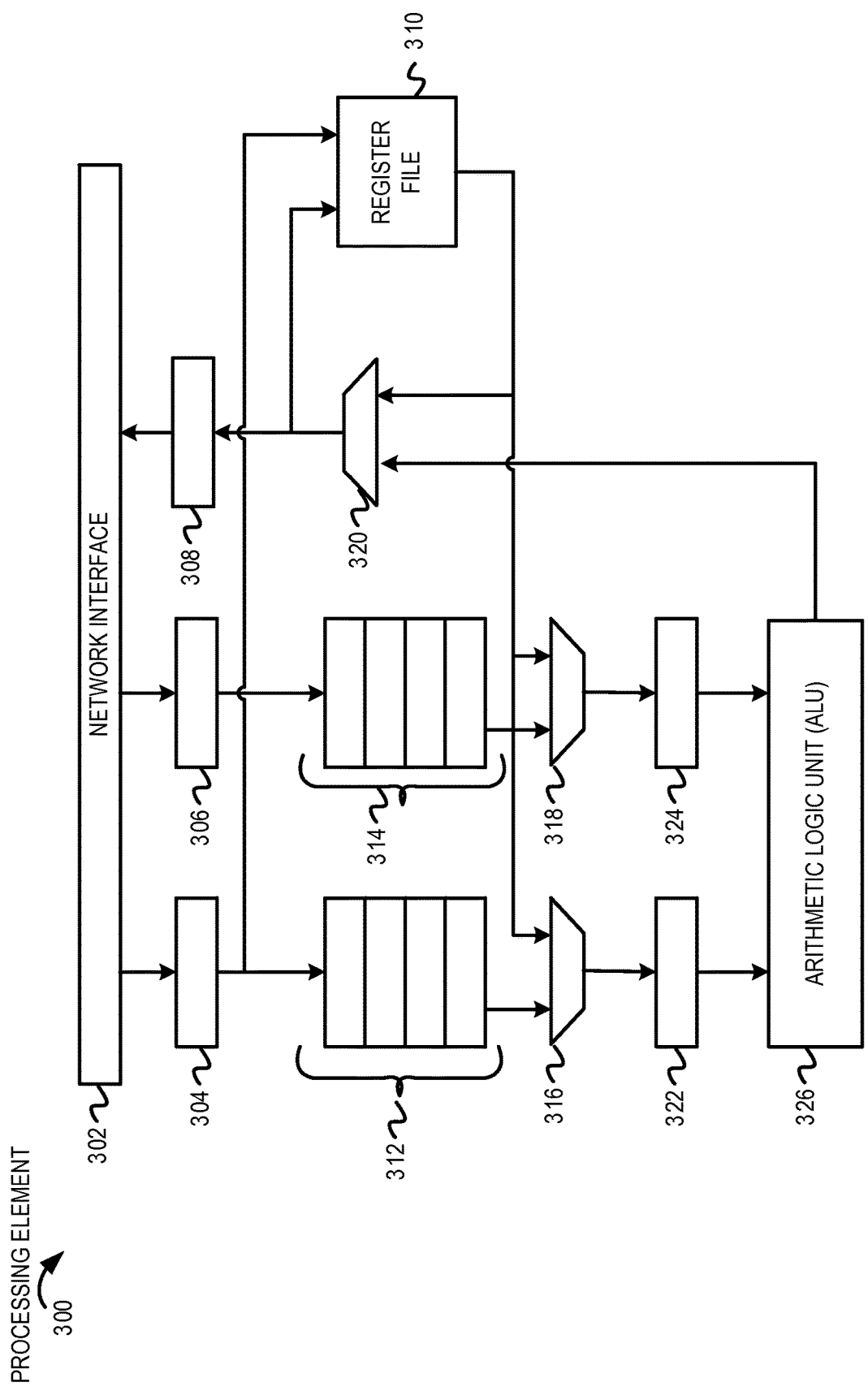
FIG. 3 is a block diagram illustrating example structure of a processing element.

FIG. 3 is a block diagram illustrating example structure of a processing element 300. The processing element 300 includes input registers 304 and 306, input queues 312 and 314, multiplexers 316, 318, and 320, a general-purpose register file 310, ALU input registers 322, 324, and output register 308, an ALU 326, and a network interface 302. In some embodiments, the register file 310 may include reference patterns to allow the processing element 300 to perform pattern matching operations. In another embodiment, the ALU 326 may write results to the register file 310 and read the results for subsequent calculations. The input register 304 is coupled with the input queue 312; while the input register 306 is coupled with the input queue 314. The input registers 304 and 306 receive input data (e.g., data to be analyzed, reference patterns, etc.) via network interface and provide the input data to an appropriate input queue or to the register file 310. The multiplexer 316 receives inputs from the input queue 312 and the register file 310. Likewise, the multiplexer 318 receives inputs from the input queue 314 and the register file 310. Each multiplexer 316 and 318 can select one of the inputs (e.g., either the input data stored in the input queue or data stored in the register file 310) and provide the selected input at the output. The output of the multiplexers 316 and 318 is stored in the ALU input registers 322 and 324, respectively. The ALU input registers 322 and 324 are coupled with the ALU 326. In one embodiment, the ALU 326 may be a 16-byte single-instruction-multiple-data (SIMD) ALU. In other embodiments, the ALU 326 may be another suitable type of data processing unit. In one example of a pattern matching application, the register file 310 may include one or more reference patterns. In this example, the ALU 326 can compare the input data against one or more reference patterns and generate a corresponding output. The output of the ALU 326 may indicate whether the input data matched any of the reference patterns, as will be further described below. The output of the ALU 326 is provided to the multiplexer 320. Additionally, the multiplexer 320 is also coupled with the register file 310. The multiplexer 320 can select one of the inputs (e.g., either the output of the ALU 326 or data from the register file 310) and store the selected input in the output register 308. The result in the output register 308 can be provided, via the network interface 302, for storage at a destination memory address or for subsequent processing.

The components and interconnections depicted in FIG. 3 illustrate one example of the structure of the processing element 300. In other implementations, each processing element in the reconfigurable array processor may include additional components (e.g., registers, logic elements, etc.) or may not include some components depicted in FIG. 3. Furthermore, depending on the application to be executed by the reconfigurable array processor, one or more components of each processing element 300 may be enabled or disabled to allow the processing element 300 to execute operations associated with the application. Depending on the application to be executed by the reconfigurable array processor, one or more interconnections between components of the processing element 300 can be reconfigured to allow the processing element 300 to execute operations associated with the application. For example, the input queue 314 and the input register 306 may not be used for the pattern matching application described herein. In this example, the multiplexer 318 may be configured to select a reference pattern from the register file 310 and store the reference pattern in the ALU input register 324 for transmission to the ALU 326. As another example, to add two operands supplied by the network to the input registers 304 and 306 and pass the result back to the network, both the input queues 312 and 314 may be enabled. In this example, the multiplexers 316 and 318 can route the operands from their respective input queues to the ALU input registers 322 and 324; the multiplexer 320 can route the result generated by the ALU 326 to the output register 308. In this example, the register file 310 may be disabled.

Figure 4:
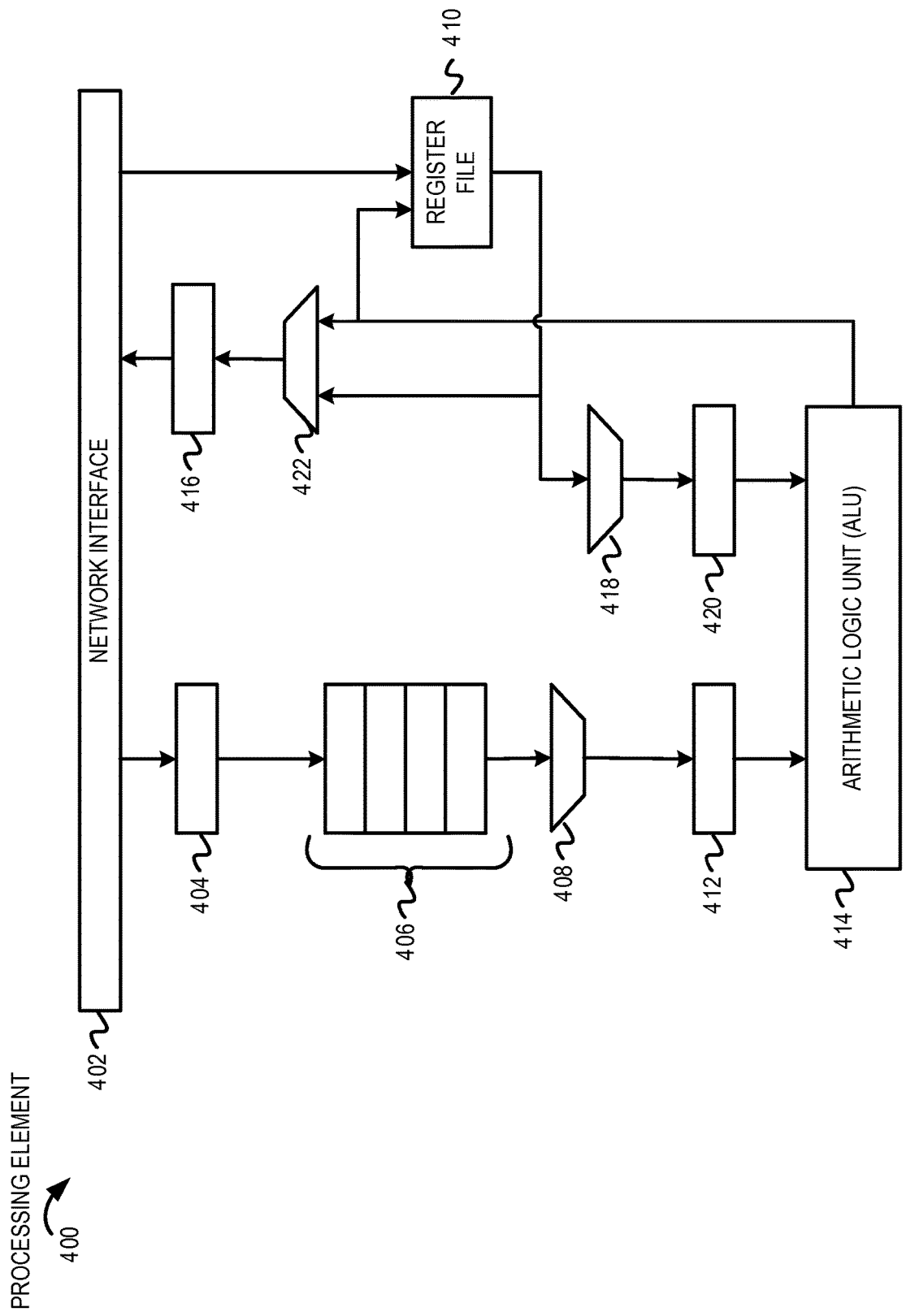
FIG. 4 is a block diagram illustrating example structure of a processing element configured for pattern matching.

FIG. 4 is a block diagram illustrating example structure of a processing element configured for pattern matching. As described above with reference to FIG. 1, the execution control unit 108 can receive a pattern matching program that indicates the interconnections between processing elements and the instructions to be executed by the processing elements for pattern matching. Additionally, the pattern matching program may also indicate interconnections between components of a processing element, which components (if any) of the processing element should be disabled for pattern matching, and so on. FIG. 4 is an example implementation of a processing element 400 that is configured for pattern matching. The processing element 400 includes a network interface 402, an input register 404, an input queue 406, multiplexers 408, 418, and 422, ALU input registers 412 and 420, a register file 410, an ALU 414, and a result register 416.

As described above, the execution control unit 108 can load a sub-program into each processing element of the reconfigurable array processor to cause the processing element to operate on a portion of an input data stream. In some embodiments, the execution control unit 108 may provide a program address at which the sub-program for pattern matching is stored to the ALU 414. In another embodiment, the sub-program for pattern matching may be stored as part of the processing element 400 (e.g., a program file or a control unit associated with the processing element 400). In another embodiment, the processing element 400 may include multiple sub-programs for different applications. In this embodiment, the execution control unit 108 may provide a control signal to the processing element 400 to activate the sub-program for pattern matching. The execution control unit 108 may also provide control signals to initialize various registers of the processing element 400. For example, a value of "0" may be stored in the result register 416 to initialize the result register 416. The ALU 414 may also include a program counter to indicate the address from which the next instruction of the sub-program should be accessed. Based on a control signal from the execution control unit 108, the program counter may be initialized to store the address from which the first instruction of the sub-program should be accessed. Interconnections between processing elements, interconnections between PE clusters, and/or interconnections between components of a processing element may be disabled based on control signals from the execution control unit 108. For example, comparing FIGS. 3 and 4, some components of the processing element 300 (e.g., the components 306, 314, and 320) may be disabled for pattern matching, while other components of the processing element 300 (e.g., the components 318 and 324) may be reconfigured to route reference patterns from the register file 310 to the ALU 326. After configuring the reconfigurable array processor for pattern matching, the execution control unit 108 can provide a notification to start executing operations for pattern matching.

The processing element 400 can receive a portion of an input data stream via the network interface 402. The processing element 400 can store the portion of the input data stream in the input register 404 and the input queue 406. The input queue 406 may be a first-in first-out (FIFO) queue or another suitable type of queue. The interconnections between the components of the processing element 400 can be reconfigured such that the input queue 406 is coupled with the multiplexer 408 which, in turn, is coupled with the ALU input register 412. Additionally, the register file 410 is coupled with the multiplexer 418 which, in turn, is coupled with the ALU input register 420. The multiplexer 408 receives the portion of the input data stream from the input queue 406 and stores the portion of the input data stream in the ALU input register 412. Likewise, the multiplexer 418 receives a reference pattern from the register file 410 and stores the reference pattern in the ALU input register 420. The ALU 414 receives the portion of the input data stream and the reference pattern from the ALU registers 412 and 420, respectively. The ALU 414 can compare the portion of the input data stream against the first reference pattern. If there is a second reference patterns in the register file 410, the multiplexer 418 can select and provide the second reference pattern to the ALU 414 via the ALU input register 420. The ALU 414 can compare the portion of the input data stream in the ALU input register 412 against the second reference pattern.

Figure 5:
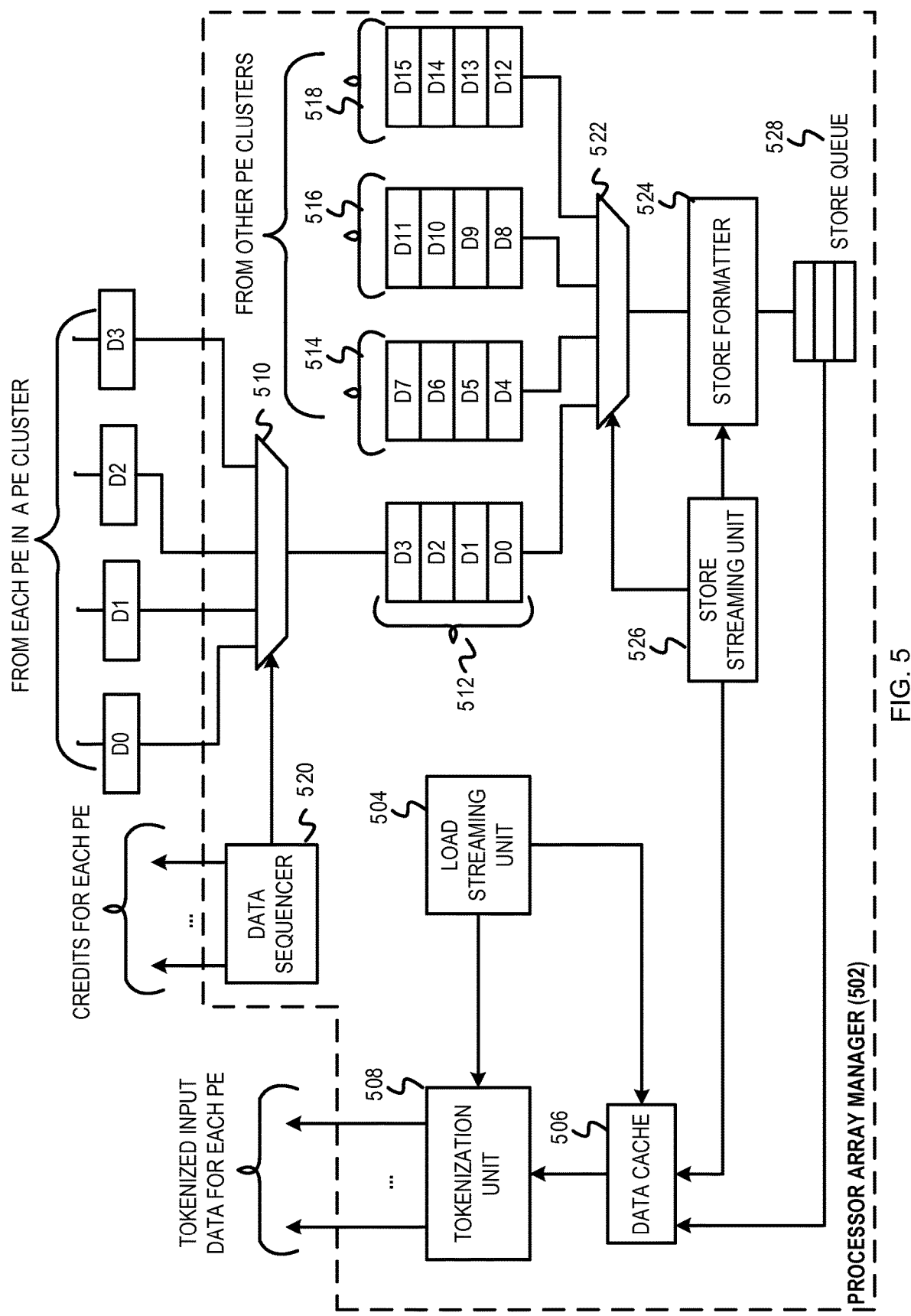
FIG. 5 is a block diagram illustrating an example implementation of a processor array manager.

The result of each comparison operation may be stored in a register in the register file 410. When all the reference patterns have been compared against the portion of the input data stream, the portion of the input data stream can be "popped" from the input queue 406. For example, the portion of the input data stream may be removed from the head of the FIFO input queue 406, and the remaining entries in the input queue 406 may advance 1 entry toward the head. The data in the input register 404 can be moved into the input queue 406. The processing element 400 may notify the processor array manager that the processing element 400 is capable of receiving another portion of the input data stream (e.g., that the input register 404 is empty). The processing element 400 can also read the result from the register file and multiplex the result into the output register 416 (by the multiplexer 422). The result can then be transmitted from the output register 416 to the processor array manager via the network interface 402. FIG. 5 will further describe how the processor array manager 114 provides the input data stream to the processing element and processes the results received from the processing element.

FIG. 5 is a block diagram illustrating an example implementation of a processor array manager 502. The processor array manager 502 includes a load streaming unit 504, a data cache 506, and a tokenization unit 508 for providing input data to the processing elements. The processor array manager 502 also includes a data sequencer 520, a store streaming unit 526, and a store formatter 524 for analyzing results received from the processing elements. The load streaming unit 504 may determine a source address from which the input data stream should be fetched. For pattern matching, the load streaming unit 504 can fetch input data from a source address in response to receiving a control signal from the execution control unit (not shown in FIG. 5). In one implementation, the source address may be pre-programmed in the load streaming unit 504. In another implementation, the execution control unit can provide the source address to the load streaming unit 504 in response to receiving a pattern matching program for execution.

The load streaming unit 504 can fetch one or more bytes of the input data stream and store the input data in the data cache 506. In one implementation, the load streaming unit 504 may fetch the input data stream in the form of quad-words (i.e., 16 bytes) with a stride of one byte. In one example, the reconfigurable array processor may include 16 processing elements and each processing element may operate on one quadword (e.g., 16-bytes) of the input data stream. In this example, the load streaming unit 504 may fetch 16×16 bytes of the input data stream. Alternatively, the load streaming unit 504 may fetch any suitable number of bytes of the input data stream depending on the number of processing elements in the reconfigurable array processor, the number of bytes that each processing element can process, and/or the depth of the input queue associated with each processing element.

The tokenization unit 508 receives the input data stream from the data cache 506 and generates a corresponding output for each byte of the input data stream ("input data byte"). The corresponding output may also be referred to as a "token." In some embodiments, a token may represent a class of characters (or a data type). For example, a token may represent all alphabetic characters, also referred to as "alpha" (e.g., 'A' to 'Z' and 'a' to 'z'). In this embodiment, the tokenization unit 508 can classify each input data byte according to data type. For each input data stream, the tokenization unit 508 can substitute a token depending on the data type associated with the input data byte. Thus, the tokenization unit 508 may generate a different token depending on whether the input data byte is an alpha, a number, a separator, punctuation, a symbol, a specific alpha, a specific number, etc. For example, the tokenization unit 508 may receive four input data bytes "4ab&" and may generate a tokenized output "numeric, alpha, alpha, symbol."

Although examples refer to assigning a token to each byte of the input data stream, embodiments are not so limited. In other embodiments, the tokenization unit 508 may assign a token to any suitable portion of the input data stream. For example, the tokenization unit 508 can substitute two input data bytes by a single token to yield a tokenized input data stream. Furthermore, the tokens that correspond to each data type may vary depending on the input data stream being analyzed and/or the reference patterns. For example, the tokenization unit 508 may use a first token mapping to tokenize the input data stream that is being searched for passport information; a second token mapping to tokenize the input data stream that is being searched for telephone numbers; and so on. Furthermore, the tokens need not generically identify an input data byte as belonging to a general data type or class of characters (e.g., a generic alpha, numeric, etc.). Instead, a token may represent a specific character, such as a specific alpha, a specific number, etc. For example, to search for US passport numbers in an input data stream, token_1, token_2, and token_3 may represent the characters 'U', 'S,' and 'A' respectively. For example, a reference pattern for identifying a passport number may be as follows: 10 numeric tokens, 'U' alpha token, 'S' alpha token, 'A' alpha token, 7 numeric tokens, and 'M' (or 'F') alpha token. As another example, a reference pattern for identifying a social security number (SSN) may be as follows: 3 numeric tokens, a dash separator token, 2 numeric tokens, a dash separator token, and 4 numeric tokens. FIG. 6 illustrates an example table 600 for data tokenization. Each character 604 (or ASCII representation 602 of the character) in the input data stream is represented using an appropriate token 606 (referred to as "token coding" in FIG. 6). However, in other embodiments, other suitable tokens can be used to represent the characters of the input data stream.

Referring to the example tokenization table 600, bits 0 and 2 of the token are used to represent a token class. In this example, "0x1" represents a digit/numeric, "1x0" represents a delimiter, "1x1" represents an alpha, and "0x0" represents any other character. The character 'x' in the above example indicates that bit 1 is not taken into consideration when determining the token class. In the example of FIG. 6, bits 1 and 3-7 of the token are used to represent a character within the token class. In some embodiments, bits 1 and 3 may represent a sub-class. Whether the reference pattern is used to match a specific character or a character class may depend on the format of the reference pattern. For example, if a byte in the reference pattern has the format "0abc defg", the reference pattern byte may be used to match a specific character. In this example, the processing element can compare a byte of the tokenized input data stream ("tokenized input data byte") against the ASCII character "abc defg." As another example, if a byte in the reference pattern has a format "1abc defg", the reference pattern byte may be used to match one or more character classes. In this example, the value of the remaining bits in the reference pattern byte can indicate whether the byte should be matched to an alpha, a number, and/or another suitable class. In one implementation, when a=1, match against "other1" 0000 xxxx
when b=1, match against "delimiter1" 1000 xxxx
when c=1, match against any alpha (incl. '_') 111x xxxx
when d=1, match against any number/digit 0011 xxxx
when e=1, match against "other2" 0001 xxxx
when f=1, match against "other3" 0101 xxxx
when g=1, match against "delimiter2" 1100 xxxx For example, consider the reference pattern byte "0011 xxxx." The first four bits 0011 may indicate that the tokenized input data byte should be matched against a digit. The last four bits xxxx may identify the specific digit against which to match the tokenized input data byte. Referring to the table 600, when the token coding class is "digit," the first 4 bits of the token coding 606 are "0011." The next 4 bits (represented above as xxxx) can be any value 0000-1001 depending on the specific digit 0-9 that is to be matched. As another example, a token or reference pattern byte with the first four bits '1000' indicates a member of the 'delimiter1' class, irrespective of the last four bits of the token. In one example of this implementation, the reference pattern byte 0x61 (i.e., 0110 0001) can be used to match the alpha 'A' or 'a'. As another example, the reference pattern byte 0x88 (i.e., 1000 1000) can be used to match any number in the range 0-9. As another example, the reference pattern byte 0x98 (i.e., 1001 1000) can be used to match either an alpha class or a number class. As another example, the reference pattern byte 0xE7 (i.e., 1110 0111) can be used to match any printable, non-digit, non-alpha character.

Referring back to FIG. 5, in some embodiments, the tokenization unit 508 may receive (e.g., from the execution control unit 114) a token mapping or set of tokens that should be used to analyze the input data stream. In another embodiment, the tokenization unit 508 may include multiple token mappings. In some embodiments, each token may be one byte per character. However, in other embodiments, each token may be represented using any suitable number of bits/bytes. The tokenization unit 508 may select one token mapping based on an input from the execution control unit 114, or an input from a processor of the network device that includes the reconfigurable array processor. A portion of the tokenized input data stream is provided to a processing element and is stored in an input queue associated with the processing element. For example, the tokenization unit 508 may provide a quadword of the tokenized input data stream ("tokenized input data quadword") to the processing element 400 of FIG. 4. The processing element 400 may store the tokenized input data quadword in the input queue 406.

The load streaming unit 504 may indicate how many tokenized input data bytes should be provided to each processing element of the reconfigurable array processor. In one example, the reconfigurable array processor may include 16 processing elements (PE0-PE15). In this example, the load streaming unit 504 may fetch bytes 0-31 of the input data stream and store these input data bytes in the data cache 506. The tokenization unit 508 may tokenize the input data bytes 0-30 to yield tokenized input data bytes 0-30. Each processing element (e.g., PE0-PE15) may receive a tokenized input data quadword with a stride of 1 byte. Because the reference pattern can start at any byte position in the input data stream, a sliding window with a 1-byte stride may be used to ensure that the reference pattern (if present) is detected in the input data stream. In other words, the tokenization unit 508 (in conjunction with the load streaming unit 504) may provide a first quadword including tokenized input data bytes 0-15 to PE0, a second quadword including tokenized input data bytes 1-16 to PE1, . . . and a sixteenth quadword including tokenized input data bytes 15-30 to PE15. In other embodiments, other suitable amounts of data may be provided to each processing element with another suitable stride. For example, the tokenization unit 508 may provide 8 tokenized input data bytes with a stride of 2 bytes to each processing element. The tokenization unit 508 may determine whether to provide the tokenized input data bytes to some/all of the processing elements, which processing elements to provide the tokenized input data bytes, the number of tokenized input data bytes to provide to each processing element, the stride, etc. The tokenization unit 508 may make this determination based on the pattern matching program, a control signal from the execution control unit 108, and/or a control signal from the load streaming unit 504. For example, the execution control unit 108 may transmit a control signal to the tokenization unit 508 indicating the number of consecutive tokenized input data bytes to provide to each processing element. As another example, the execution control unit 108 may transmit a control signal to the load streaming unit 504 indicating the number of tokenized input data bytes to provide to each processing element. The load streaming unit 504, in turn, may control the number of consecutive tokenized input data bytes that are provided to each processing element.

Referring to the example of FIG. 4, the processing element 400 may receive a portion of the tokenized input data stream from the tokenization unit 508 via the network interface 402. In one example, the processing element 400 may receive a tokenized input data quadword from the tokenization unit 508. The tokenized input data quadword may be stored in the input register 404 and may subsequently be stored in the input queue 406. In response to detecting an operand (e.g., a tokenized input data quadword) in the input queue 404, the processing element 400 can start executing a micro-program for pattern matching. As discussed above, the execution control unit 114 may load the micro-program into the processing element 400. The micro-program may include the set of instructions that the processing element 400 should execute for pattern matching. Each enabled/activated processing element that receives an operand can independently execute the micro-program and generate a corresponding result. The result can indicate whether a reference pattern was detected within the portion of the tokenized input data stream that was provided to the processing element. The result generated by the processing element may be referred to as "intermediate result" or "PE result." In one implementation, the micro-program can include a set of instructions to compare the portion of the tokenized input data stream against one or more reference patterns stored in the register file 410 and generate a corresponding intermediate result. An example micro-program that is executed by each processing element in the reconfigurable array processor is as follows.

cmpacc fifo_a, R0, true ? R16=1:null
cmpacc fifo_a, R1, true ? R16=1:null
. . .
cmpacc fifo_a, R15, true ? R16=1:null
send_popA R16, result bus /* output acc, pop A operand, set pc back to 0 */

In the above example, the "cmpacc" instruction indicates that the ALU 414 compares the portion of the tokenized input data stream in the input queue ("fifo_a") against a reference pattern. In one implementation, the portion of the tokenized input data stream may be a tokenized input data quadword. If the tokenized input data quadword matches the reference pattern, the ALU 414 generates an output "1." In the above example, the register file 410 includes 17 registers—registers R0-R15 to store reference patterns and register R16 to store the intermediate result. The sub-program includes multiple "cmpacc" instructions to allow the ALU 414 to iteratively compare the tokenized input data quadword against each reference pattern in the register file 410. Prior to executing the sub-program, the processing element 400 may initialize a result register (e.g., register R16) to a default value. If there is a match, the processing element 400 can store a first value (e.g., a 16-byte quadword that represents a value "1") in the result register (e.g., register R16). However, if there is no match, the processing element 400 may not perform any action, effectively storing the default value (e.g., a 16-byte quadword that represents a value "0") in the result register. Thus, if the tokenized input data quadword matches one of the reference patterns, the value in the result register may be set to "1" irrespective of whether the tokenized input data quadword matches the other reference patterns.

In some embodiments, the processing element 400 may compare the tokenized input data quadword against all the reference patterns even if the tokenized input data quadword matched a previous reference pattern. For example, the processing element 400 may compare the tokenized input data quadword against the reference patterns R1-R15 even if the tokenized input data quadword matched the first reference pattern R0. After comparing the tokenized input data quadword to all of the reference patterns, the processing element 400 can pop the tokenized input data quadword from the input queue 406 and receive the next tokenized input data quadword. The processing element 400 may also reset the program counter to 0 (e.g., to restart executing the sub-program for the next tokenized input data quadword), and initialize the result register. Referring to the example code above, the instruction send_popA R16, result_bus can cause the processing element 400 to provide the value in the result register to the processor array manager, reset the program counter, and reset the result register (e.g., R16=0). In other embodiments, the processing element 400 may not compare the tokenized input data quadword against the remaining reference patterns if the tokenized input data quadword matched a previous reference pattern. For example, the processing element 400 may not compare the tokenized input data quadword against the reference patterns R4-R15 if the tokenized input data quadword matched the reference pattern R3. Instead, the processing element 400 may discard the current tokenized input data quadword and receive the next tokenized input data quadword after the current tokenized input data quadword matches one reference pattern. In this embodiment, each instruction to compare the tokenized input data quadword with a reference pattern may be followed by a branch to the instruction that provides the result to the processor array manager if a match is detected. Referring to the example code above, each cmpacc instruction may have a branch to the send_popA R16, result_bus instruction when the cmpacc instruction detects a pattern match. Furthermore, the processing element 400 may reset the program counter and initialize the result register after providing an indication of the pattern match to the processor array manager and discarding the current tokenized input data quadword. Although the above example describes comparing the tokenized input data against 16 reference patterns; in other embodiments, the register file 410 may include any suitable number of reference patterns. For example, when analyzing the input data stream for sensitive data, the register file 410 may include one or more patterns for passport numbers, social security numbers (SSN), birth dates, driver license numbers, etc. Although the above example describes comparing a tokenized input data quadword against a reference pattern; in other embodiments, any suitable portion of the tokenized input data stream may be compared against a reference pattern. For example, 8-bytes of the tokenized input data stream may be compared against the reference pattern.

Each processing element in the reconfigurable array processor can execute the pattern matching operations described above for the processing element 400. For example, if the reconfigurable array processor includes 16 processing elements, each of the 16 processing elements can generate a corresponding intermediate result indicating whether the portion of the tokenized input data stream provided to the processing element matched a reference pattern. If the portion of the tokenized input data stream provided to the processing element matched a reference pattern, the intermediate result can indicate that the processing element detected a pattern match. In some embodiments, each intermediate result may be a 16-byte quadword that indicates whether the corresponding processing element detected a pattern match. In other embodiments, other suitable number of bits/bytes may be used to represent whether the processing element detected a pattern match. Referring back to FIG. 5, the reconfigurable array processor includes 16 processing elements (PE0-PE15). The intermediate result generated by the processing elements PE0-PE15 is be represented by D0-D15, respectively. In other words, the processing element PE0 may generate the intermediate result D0, the processing element PE1 may generate the intermediate result D1, and so on. Furthermore, the reconfigurable array processor of FIG. 5 may include four PE clusters, each PE cluster including four processing elements. In this example, the processing elements in the first PE cluster may generate the intermediate results D0-D3, the processing elements in the second PE cluster may generate the intermediate results D4-D7, the processing elements in the third PE cluster may generate the intermediate results D8-D11, and the processing elements in the fourth PE cluster may generate the intermediate results D12-D15. Each processing element may store their respective intermediate result in an appropriate result register, as described above with reference to FIG. 4. In some embodiments, after providing the intermediate result to the processor array manager 502, the processing element can transmit a request for another tokenized input data quadword to the processor array manager (e.g., to the data sequencer 520).

The processor array manager 502 may include a multiplexer associated with each PE cluster. Multiplexer 510 is associated with the first PE cluster that includes the processing elements PE0-PE3. The multiplexer 510 can retrieve the intermediate results D0-D3 generated by the processing elements PE0-PE3 and store the results for the first PE cluster ("PE cluster result") in a result queue 512. The data sequencer 520 may indicate the sequence in which the multiplexer 510 should retrieve the intermediate results D0-D3 for storing in the result queue 512. For example, based on an indication by the data sequencer 520, the multiplexer 510 may retrieve the intermediate results in the same order as the order in which the load streaming unit 504 provided different portions of tokenized input data stream to the processing elements. In this example, if the tokenized input data quadwords were provided to the processing elements in the sequence PE0, PE1, PE2, PE3; the multiplexer 510 may retrieve the intermediate results in the same sequence D0, D1, D2, and D3. The multiplexer 510 may then store the intermediate results in the sequence D0, D1, D2, and D3 in the result queue 512.

As similarly described above, each of the other PE clusters in the reconfigurable array processor may be associated with a corresponding multiplexer. Each multiplexer may retrieve the intermediate results from the processing elements that are part of the corresponding PE cluster. Thus, a second multiplexer (not shown in FIG. 5) may store the intermediate results in the sequence D4, D5, D6, and D7 in a result queue 514. A third multiplexer (not shown in FIG. 5) may store the intermediate results in the sequence D8, D9, D10, and D11 in a result queue 516. A fourth multiplexer (not shown in FIG. 5) may store the intermediate results in the sequence D12, D13, D14, and D15 in a result queue 518. The processor array manager 502 may also include a multiplexer 522 to select the intermediate results generated by each processing element in each PE cluster for subsequent analysis. The multiplexer 522 can provide the intermediate results from the result queues 512, 514, 516, and 518 to the store formatter 524 in an appropriate sequence. The store streaming unit 526 can control the multiplexer 522 and indicate the sequence in which the multiplexer 522 should select the intermediate results from the result queues 512, 514, 516, and 518. In some embodiments, the store streaming unit 526 may indicate that the multiplexer 522 should retrieve the intermediate results from the result queues in the same order as the order in which the load streaming unit 504 provided different portions of the tokenized input data stream to the processing elements. For example, if different tokenized input data quadwords were provided to the processing elements in the sequence PE0-PE15, the multiplexer 522 may retrieve the intermediate results in the same sequence D0-D15. The multiplexer 522 may then provide the intermediate results to the store formatter 524 in the sequence D0-D15. Alternatively, depending on the application, the store streaming unit 526 may cause the multiplexer 522 to provide the intermediate results to the store formatter 524 in another suitable sequence.

The store formatter 524 can combine the intermediate result generated by each processing element to yield a final result. The intermediate results and/or the final result may each be represented using any suitable number of bits/bytes. For example, the intermediate results and the final result may each be a 16-byte quadword. If the store formatter 524 receives 16 intermediate results (from 16 processing elements) as depicted in FIG. 5, the store formatter 524 may combine 16×16-byte intermediate results to form a one 16-byte final result. More generally, the final result can represent a combination of the individual results generated by all the processing elements of the reconfigurable array processor that executed operations for pattern matching. In one embodiment, the store formatter 524 can combine a portion of each intermediate result to generate the final result. In some embodiments, the store formatter 524 may concatenate the least significant bytes of each intermediate result to generate the final result. For example, the store formatter 524 may receive 16 intermediate results (e.g., D0-D15) when the reconfigurable array processor includes 16 processing elements. Each of the intermediate results D0-D15 may include 16 bytes (e.g., bytes B0-B15). The store formatter 524 may select the 15$^{th}$ byte (i.e., B15) from each of the intermediate results D0-D15 and concatenate the selected bytes to form the final result. An example of the final result is depicted in Exp. 1, where $Dn_{B15}$ represents the 15$^{th}$ byte (or least significant byte) of the intermediate result generated by the n$^{th}$ processing element of the reconfigurable array processor.

$$\text{Final result}=D0_{B15}\ D1_{B15}\ D2_{B15}\ D3_{B15}\ D4_{B15}\ D5_{B15}\\ D6_{B15}\ D7_{B15}\ D8_{B15}\ D9_{B15}\ D10_{B15}\ D11_{B15}\\ D12_{B15}\ D13_{B15}\ D14_{B15}\ D15_{B15}$$

Exp. 1

In other embodiments, other suitable number of bits or bytes from each intermediate result may be combined to form the final result. The final result can be used to determine whether the input data stream matches at least one reference pattern, which processing element detected the pattern match, and which bytes of the input data stream matched the reference pattern. For example, if the final result includes a byte with a value "1," this can indicate that the tokenized input data quadword provided to one of the processing elements matched a reference pattern. The position of the byte with value "1" can indicate which processing element detected the pattern match and which portion of the input data stream matched the reference pattern. In some embodiments, the store formatter 524 may also store the final result at a destination memory address. In some embodiments, the store streaming unit 526 may indicate whether the final result should be stored and where to store the final result. For example, the store streaming unit 526 may indicate that the final result should be stored if the final result indicated at least one pattern match. As another example, the store streaming unit 526 may indicate that the final result should not be stored if the final result indicated that there were no pattern matches. In some embodiments, the store formatter 524 may temporarily store the final result including an indication of the destination memory address in the store queue 528. The store formatter 524 may then determine a next final result based on a next set of intermediate results received from the processing elements. The store formatter 524 may store the next final result in the store queue 528. The final results in the store queue 528 may be stored in the data cache 506 beginning at the destination memory location after the store queue 528 is full, after a predetermined number of final results are stored, after a predetermined time interval elapses, etc.

In some embodiments, the processor array manager 502 may use suitable flow control techniques to control when the next portion of the input data stream is provided to a processing element and when the processing element should start processing the next portion of the input data stream. In one example, the data sequencer 520 may transmit a control signal (also referred to as a "credit") to a processing element to indicate that the intermediate result associated with the preceding portion of the input data stream was successfully received. Providing the credit to the processing element can also indicate that the processing element should start analyzing the next portion of the input data stream (if any). Referring to the example of FIG. 2, the multiplexer 510 may be associated with the PE cluster 204. After receiving the intermediate result D0 generated by the processing element 202A, the data sequencer 520 can transmit a credit to the processing element 202A to indicate that the intermediate result D0 was successfully received. In response to receiving the credit, the processing element 202A can retrieve the next tokenized input data quadword from the input queue, execute pattern match operations on the next tokenized input data quadword, and determine a corresponding intermediate result. In some embodiments, in response to receiving the credit, the processing element 202A may transmit a control signal to the load streaming unit 504 requesting another tokenized input data quadword to analyze or store in the input queue. In other embodiments, after the final result is determined, the store streaming unit 526 may transmit a control signal to the load streaming unit 504 indicating that another set of input data stream bytes should be fetched, tokenized, and provided to the processing elements. However, in other embodiments, other suitable flow control techniques may be employed.

Figure 7:
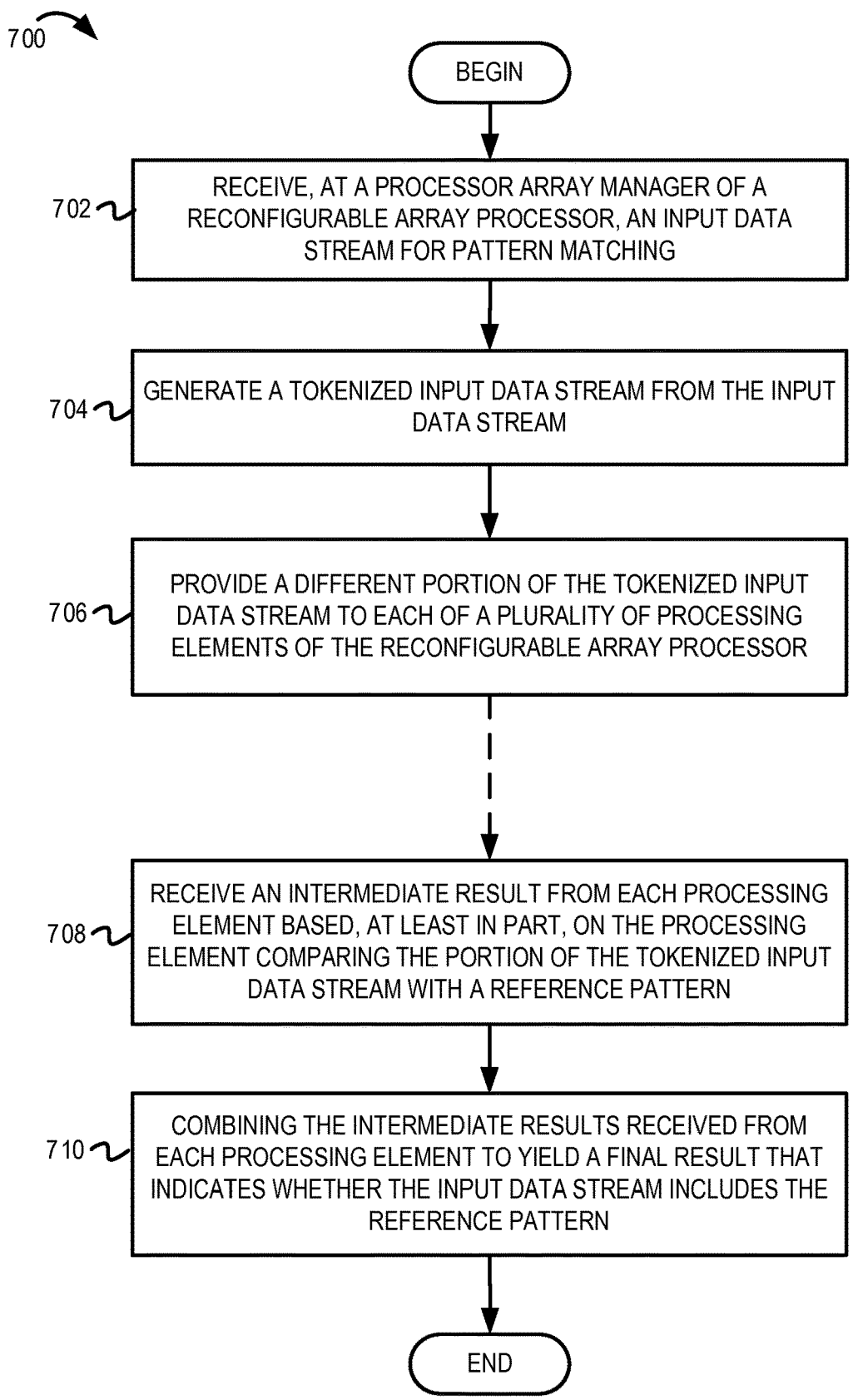
FIG. 7 is a flow diagram illustrating example operations for pattern matching using a reconfigurable array processor.

FIG. 7 is a flow diagram illustrating example operations for pattern matching using a reconfigurable array processor. Flow 700 begins at block 702.

An input data stream for pattern matching is received at a processor array manager of a reconfigurable array processor (block 702). In some embodiments, a central processor of a network device may provide a notification to the processor array manager to execute pattern matching on the input data stream. The notification may indicate a source address from which to access the input data stream. In some embodiments, the reconfigurable array processor may execute pattern matching operations in the background while the central processor (or an application of the network device) executes other operations on the input data stream. In other words, the reconfigurable array processor and the central processor may execute their respective operations in parallel on the input data stream. In other embodiments, the reconfigurable array processor may execute pattern matching operations at any suitable time relative to the central processor (or application). The flow continues at block 704.

A tokenized input data stream is generated from the input data stream (block 704). Each segment (e.g., byte) of the input data stream may be compared against a plurality of tokens. An appropriate token may be selected for a segment of the input data stream depending on the data type or value of the segment of the input data stream. For example, four bytes "4ab&" of the input data stream may be converted into tokenized input data stream "numeric, alpha, alpha, symbol." As another example, three bytes "USA" of the input data stream may be converted into a tokenized input data stream, "token_1, token_2, token_3." Operations for generating the tokenized input data stream are further described above with reference to FIG. 5. The flow continues at block 706.

A different portion of the tokenized input data stream is provided to each of a plurality of processing elements of the reconfigurable array processor (block 706). A sliding window with a suitable stride may be implemented to select a different portion of the tokenized input data stream and provide the selected portion to one of the processing elements. For example, for a sliding window with a stride of 1-byte, a first tokenized input data quadword including bytes 0-15 may be provided to a first processing element of the reconfigurable array processor; a second tokenized input data quadword including bytes 1-16 may be provided to a second processing element; and so on. The flow continues at block 708.

An intermediate result is received from each processing element based, at least in part, on the processing element comparing the portion of the tokenized input data stream with a reference pattern (block 708). Each processing element may include a register file including one or more reference patterns. The processing element may compare the portion of the tokenized input data stream (provided to the processing element) with each reference pattern in the register file. The processing element may indicate a first value (e.g., value="1") in a result register of the processing element if the portion of the tokenized input data stream matches a reference pattern. The result register may indicate a second value (e.g., value="0") if the portion of the tokenized input data does not match any reference pattern. The value in the result register may be provided to the processor array manager as the intermediate result associated with the processing element. In FIG. 7, the connection between blocks 706 and 708 is represented using dashed lines to indicate that the processor array manager may wait for each of the processing elements to execute pattern matching operations and to provide the corresponding intermediate result to the processor array manager. The flow continues at block 710.

The intermediate results received from each processing element are combined to yield a final result that indicates whether the input data stream includes the reference pattern (block 710). In some embodiments, as described above in FIG. 5, a predetermined number of processing elements may be logically or physically grouped together to form PE clusters, and the reconfigurable array processor may include multiple PE clusters. In some embodiments, each PE cluster may be associated with a multiplexer that organizes the intermediate result associated with each processing element of the PE cluster in an appropriate sequence. Furthermore, another multiplexer associated with the processor array manager may provide the intermediate result received from all the PE clusters in an appropriate sequence for subsequent processing. In some embodiments, the intermediate results received from all the processing elements may be combined to form the final result. In another embodiment, a portion of the intermediate results received from each processing element may be combined to form the final result. For example, each of the intermediate results may be a 16-byte quadword. The least significant byte (e.g., byte 15) of each of the intermediate results may be concatenated to form the final result, as depicted by Exp. 1. The final result may indicate whether the input data stream includes at least one reference pattern, which processing element detected the presence of the reference pattern, and/or which bytes of the input data stream matched the reference pattern. From block 710, the flow ends.

Figure 8:
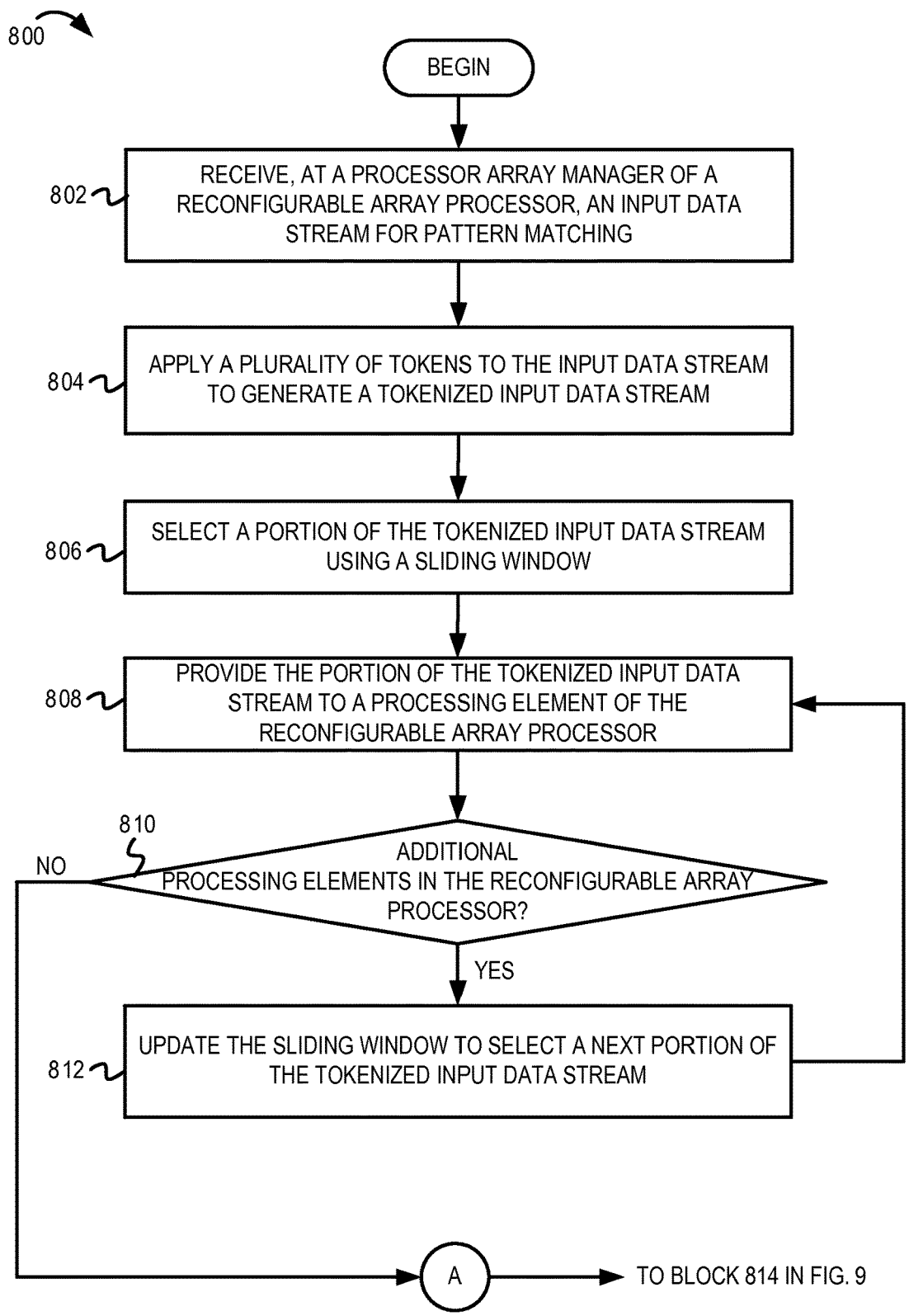
FIG. 8 is a flow diagram including example operations of a processor array manager of the reconfigurable array processor.
Figure 9:
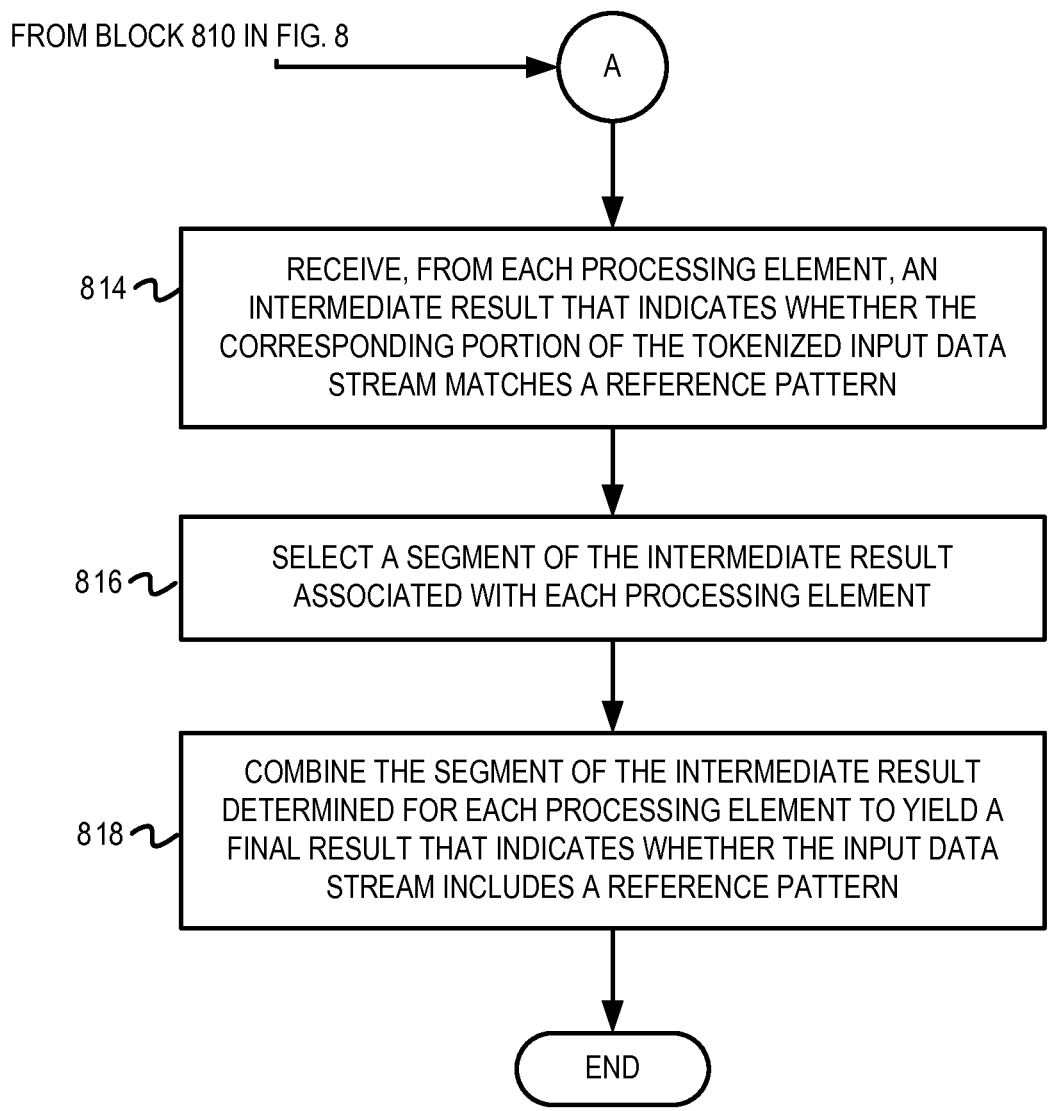
FIG. 9 is a continuation of FIG. 8 and also illustrates example operations of the processor array manager.

FIG. 8 and FIG. 9 illustrate a flow diagram including example operations of a processor array manager of the reconfigurable array processor. Flow 800 begins at block 802 in FIG. 8.

An input data stream for pattern matching is received at a processor array manager of a reconfigurable array processor (block 802). In some embodiments, a central processor of a network device may provide a notification to the processor array manager to execute pattern matching on the input data stream. The notification may indicate a source address from which to access the input data stream. In some embodiments, the reconfigurable array processor may execute pattern matching operations in the background while the central processor (or an application of the network device) executes other operations on the input data stream. In other words, the reconfigurable array processor and the central processor may execute their respective operations in parallel on the input data stream. In other embodiments, the reconfigurable array processor may execute pattern matching operations at any suitable time relative to the central processor (or application). The flow continues at block 804.

A plurality of tokens is applied to the input data stream to generate a tokenized input data stream (block 804). Each segment (e.g., byte) of the input data stream may be compared against a plurality of tokens. An appropriate token may be selected for a segment of the input data stream depending on the data type or value of the segment of the input data stream. Operations for generating the tokenized input data stream are further described above with reference to FIG. 5. The flow continues at block 806.

A portion of the tokenized input data stream is selected using a sliding window (block 806). A sliding window with a suitable stride may be implemented to select a different portion of the tokenized input data stream and provide the selected portion to one of the processing elements. The portion of the tokenized input data stream that is selected may depend on the length of the sliding window. The start of the next portion of the tokenized input stream may depend on the stride of the sliding window. For example, if the length of the sliding window is 16 bytes, a 16-byte portion of the tokenized input data stream (e.g., a tokenized input data quadword) may be selected. The flow continues at block 808.

The portion of the tokenized input data stream is provided to a processing element of the reconfigurable array processor (block 808). After selecting the portion of the tokenized input data stream based on the length and the stride of the sliding window, the selected portion of the tokenized input data stream is provided to one processing element of the reconfigurable array processor. As described above, the processing element can compare the portion of the tokenized input data stream against one or more reference patterns and generate a corresponding result. The flow continues at block 810.

It is determined whether there are additional processing elements in the reconfigurable array processor (block 810). If there are additional processing elements in the reconfigurable array processor, the flow continues at block 812. Otherwise, if a different portion of the tokenized input data stream has been provided to each processing element in the reconfigurable array processor, the flow continues at block 814 in FIG. 9.

The sliding window is updated to select a next portion of the tokenized input data stream for providing to a next processing element (block 812). For example, the sliding window may be updated based, at least in part, on a stride of the sliding window. In other words, the beginning of the next portion of the tokenized input stream may depend on the stride of the sliding window. The length of the next portion of the tokenized input data stream may depend on the length of the sliding window. For example, if the length of the sliding window is 16 bytes and the stride is 1 byte, bytes 0-15 may be selected as a first portion of the tokenized input data stream. The sliding window may then be updated by 1 byte and bytes 1-16 may be selected as the next portion of the tokenized input data stream. After selecting the next portion of the tokenized input data stream, the flow loops back to block 808 where the next portion of the tokenized input data stream is provided to another processing element of the reconfigurable array processor.

An intermediate result is received from each processing element, the intermediate result indicating whether the corresponding portion of the tokenized input data stream matches a reference pattern (block 814). The flow 800 moves from block 810 in FIG. 8 to block 814 in FIG. 9 in response to determining that a different portion of the tokenized input data stream was provided to each processing element of the reconfigurable array processor. In some embodiments, the processing element may execute operations for pattern matching in response to receiving the portion of the tokenized input data stream. In other embodiments, the processing element may execute operations for pattern matching after receiving a suitable control signal. The processing element can compare the portion of the tokenized input data stream against one or more reference patterns to generate the intermediate result. The intermediate result can indicate whether the portion of the tokenized input data stream matched any of the reference patterns. The flow continues at block 816.

A segment of the intermediate result associated with each processing element is selected (block 816). In some embodiments, the processor array manager can wait until all the enabled/activated processing elements in the reconfigurable array processor have reported their respective intermediate result. After the intermediate results are received from all the processing elements, one or more multiplexers can control the sequence in which the intermediate results are processed. In other embodiments, the processor array manager may not wait until all the processing elements have reported their respective intermediate result. Instead, the processor array manager may start forming the final result after receiving an intermediate result from some (e.g., one) of the processing elements. For example, the intermediate results may be received sequentially in the order D0, D1, D2, . . . D15. The processor array manager can begin forming the final result stream by processing each of the intermediate results as they are received.

In some embodiments, as described above in FIG. 5, a predetermined number of processing elements may be grouped together to form PE clusters, and the reconfigurable array processor may include multiple PE clusters. In some embodiments, for each PE cluster, a multiplexer may organize the intermediate results received from the processing elements of the PE cluster in a particular sequence. Next, another multiplexer may organize the intermediate results received from all of the PE clusters in a particular sequence. In some embodiments, a segment of the intermediate result associated with each processing element may be selected to form a final result. For example, each of the intermediate results may be a 16-byte quadword. The least significant byte (e.g., byte 15) of each of the intermediate results may be selected. In this example, the least significant byte of the intermediate result represents the segment of the intermediate result. However, other segments of the intermediate results (e.g., a most significant byte, most significant bit, last two bytes, etc.) may be selected. The flow continues at block 818.

The segments of the intermediate result determined for each processing element are combined to yield a final result that indicates whether the input data stream includes a reference pattern (block 818). In some embodiments, the segment of the intermediate results may be concatenated to form the final result. For example, the least significant byte of each of the intermediate results may be concatenated to yield the final result, as depicted by Exp. 1. In other embodiments, the segment of the intermediate results may be combined using other suitable techniques (e.g., arithmetic operations, logic operations, etc.) to form the final result. In one implementation, the segment of the intermediate results may be combined using a logical OR operation. For example, the final result may be determined as $D0_{B15}$ OR $D1_{B15}$ OR $D2_{B15}$ . . . If any of the processing elements detected a pattern match (e.g., if any of the intermediate results have a value "1"), the final result would be "1." The final result would be "0" if none of the processing elements detected a pattern match (e.g., if all the intermediate results have a value "0"). Alternatively, the entire intermediate result associated with each processing element may be combined to form the final result. The final result may indicate whether the input data stream includes a reference pattern, which processing element detected a pattern match, and/or which bytes of the input data stream matched the reference pattern. From block 818, the flow ends.

Although not depicted in FIGS. 8-9, the processor array manager can transmit a control signal (also referred to as a credit) to a processing element after successfully receiving the intermediate result from the processing element. The control signal can indicate can that processing element should execute pattern match operations on the next operand (e.g., another portion of the tokenized input data stream). In some embodiments, the processing element may receive the next operand and/or a notification to execute pattern matching operations on the next operand as soon as the processor array manager receives the intermediate result from the processing element. Thus, a processing element may start analyzing the next operand after providing the intermediate result associated with the previous operand, and may not wait until the processor array manager receives an intermediate result from all the processing elements. However, in other embodiments, each processing element may receive a new operand and/or a notification to analyze a new operand after the processor array manager receives the intermediate result from all the processing elements in the reconfigurable array processor.

Figure 10:
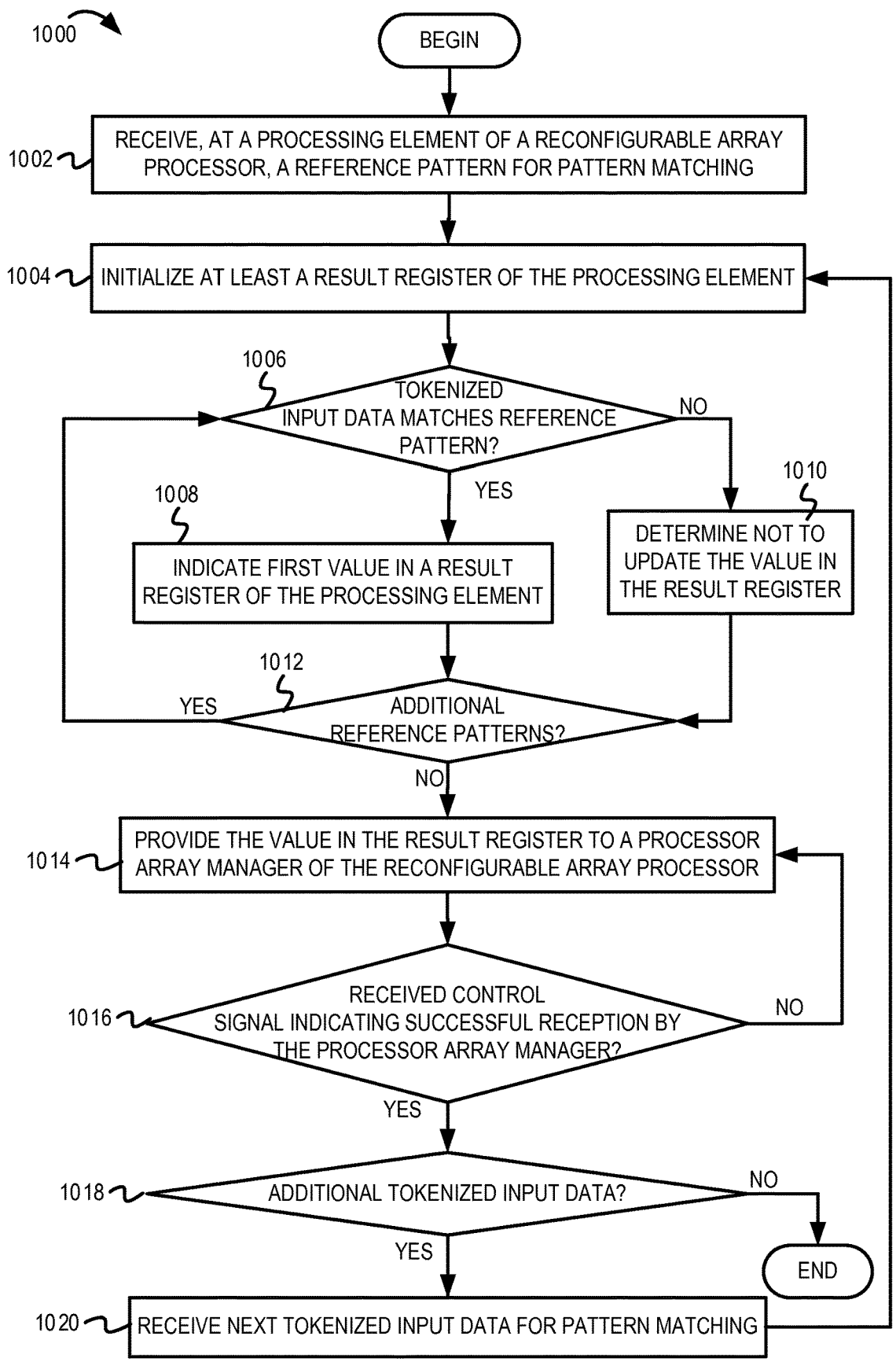
FIG. 10 is a flow diagram illustrating example operations of a processing element of a reconfigurable array processor for pattern matching.

FIG. 10 is a flow diagram illustrating example operations of a processing element of a reconfigurable array processor for pattern matching. Flow 1000 begins at block 1002.

A reference pattern for pattern matching is received at a processing element of a reconfigurable array processor (block 1002). One or more reference patterns may be provided to the processing element for storage in a register file associated with the processing element. In some embodiments, each processing element of the reconfigurable array processor may be associated with a corresponding register file. In other embodiments, some/all of the processing elements of the reconfigurable array processor may share a common register file. The flow continues at block 1004.

At least a result register of the processing element is initialized (block 1004). In some embodiments, various components of the reconfigurable array processor may be initialized for pattern matching. In some implementations, as part of the initialization, a program counter associated with the processing element may be updated to include the address of the first instruction of the pattern matching operations that should be executed by the processing element. Furthermore, a result register associated with the processing element may be initialized. In one example, the value "0" may be used to initialize the result register. However, the result register may be initialized by storing another suitable value in the result register. In some implementations, the result register may be a 16 byte register and the processing element may store a 16-byte representation of the default value (e.g., value="0") in the result register. In other implementations, the result register may comprise any suitable number of bits or bytes (e.g., 1-byte result register, 1-bit result register, etc.). The flow continues at block 1006.

It is determined whether tokenized input data received at the processing element matches a reference pattern (block 1006). As described above, the processing element may receive a portion of a tokenized input data stream (e.g., a tokenized input data quadword). The tokenized input data stream may be generated by comparing an input data stream against a plurality of tokens. The processing element may compare the portion of the tokenized input data stream with the reference pattern to determine whether the portion of the tokenized input data stream matches or includes the reference pattern. If the tokenized input data matches the reference pattern, the flow continues at block 1008. Otherwise, the flow continues at block 1010.

A first value is indicated in a result register of the processing element if the tokenized input data matches the reference pattern (block 1008). For example, if the portion of the tokenized input data stream matches (or includes) the reference pattern, the processing element may store a value "1" in the result register. However, other suitable values may be used to indicate that the portion of the tokenized input data stream matches the reference pattern. In some implementations, the result register may be a 16 byte register and the processing element may store a 16-byte representation of the first value (e.g., value="1") in the result register. In other implementations, the result register may comprise any suitable number of bits or bytes (e.g., 1-byte result register, 1-bit result register, etc.). The flow continues at block 1012.

If the tokenized input data does not match the reference pattern, it is determined not to update the value in the result register (block 1010). For example, the processing element may not perform any action, if the portion of the tokenized input data stream does not match (or does not include) the reference pattern. In some embodiments, the result register may be initialized with a default value before the processing element executes operations for pattern matching. The default value may indicate that the portion of the tokenized input data stream does not match any of the reference patterns. In this embodiment, the processing element need not re-write the default value in the result register if the portion of the tokenized input data stream does not match the reference pattern. Furthermore, if the portion of the tokenized input data stream matched a previous reference pattern, the result register may include the first value. The processing element can preserve the indication of a previous pattern match in the result register by not performing any action when the portion of the tokenized input data stream does not match a current reference pattern. In one example, the value "0" may be used to initialize the result register and to indicate that the portion of the tokenized input data stream does not match the reference pattern. However, other suitable values may be used to indicate that the portion of the tokenized input data stream does not match the reference pattern. The flow continues at block 1012.

It is determined whether additional reference patterns are to be analyzed (block 1012). In some embodiments, the register file may include multiple reference patterns. For example, if the processing element executes operations to search for sensitive data in the input data stream, the register file may include a first reference pattern for passport information, a second reference pattern for phone numbers, a third reference pattern for social security numbers, and so on. If there are additional reference patterns in the register file, a next reference pattern is selected and the flow loops back to bock 1006. Otherwise, the flow continues at block 1014.

The value in the result register is provided to a processor array manager of the reconfigurable array processor (block 1014). The value in the result register may be provided to the processor array manager as the intermediate result associated with the processing element. The intermediate result can indicate whether the portion of the tokenized input data (previously provided to the processing element) matched any of the reference patterns. The processor array manager can combine the intermediate result received from the processing element with intermediate results received from other processing elements, as described above. The flow continues at block 1016.

It is determined whether a control signal indicating successful transmission of result was received (block 1016). After providing the intermediate result associated with the current portion of the tokenized input data stream, the processing element may receive the control signal from the processor array manager. The control signal can indicate that the processor array manager successfully received the intermediate result. In addition, the control signal can indicate that the processing element should analyze another portion of the tokenized input data stream. If the control signal was received at the processing element, the flow continues at block 1018. Otherwise, the flow loops back to block 1014 where the processing element continues to wait for the control signal.

It is determined whether to process additional tokenized input data (block 1018). In some embodiments, after receiving the control signal at block 1016, the processing element may determine whether there is additional tokenized input data in an input data queue associated with the processing element. In another embodiment, after receiving the control signal, the processing element may request additional tokenized input data from the processor array manager. In another embodiment, after receiving the control signal, the processing element can determine whether it received additional tokenized input data from the processor array manager. If the processing element determines to process additional tokenized input data, the flow continues at block 1020. Otherwise, the flow ends.

A next tokenized input data is received for pattern matching (block 1018). For example, if the reconfigurable array processor includes 16 processing elements and each processing element analyses 16 bytes of the tokenized input data stream with a stride of 1 byte, a first processing element may receive bytes 0-15 for analysis, a second processing element may receive bytes 1-16, and the sixteenth processing element may receive bytes 15-30. After providing the intermediate result and receiving the control signal, the first processing element may receive bytes 31-46 as the next portion of the tokenized input data stream for analysis, the second processing element may receive bytes 32-47, and so on. From block 1020, the flow loops back to block 1004 where the result register is initialized and the processing element compares the next tokenized input data against a reference pattern.

It should be understood that FIGS. 1-10 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently.

In some embodiments, the central processor, another processing component, or another suitable application may further analyze the final result to determine whether the input data stream includes one of the reference patterns. The final result may be stored in memory along with an indication of the segment of the input data stream that was analyzed to generate the final result. In other embodiments, the segment of the input data stream that was analyzed to generate the final result may be stored in memory along with an indication of whether a pattern match was detected. For example, a 2-quadword segment of the input data stream may be distributed across 16 processing elements, as described above. The 2-quadword segment of the input data stream may be stored in memory. One or more bits/bytes may be appended after the 2-quadword segment to indicate whether the 2-quadword segment of the input data stream matches a reference pattern. In one implementation, a 1-bit indicator may be used to indicate whether a pattern match was detected. For example, bit=0 can indicate that no reference pattern was detected in the segment of the input data stream. In other implementations, other suitable number of bits (e.g., a 1-byte indicator) may be used to indicate whether a pattern match was detected.

Although examples describe the processing element comparing the entire portion of the tokenized input data stream against the reference pattern, embodiments are not so limited. In other embodiments, the processing element can compare the portion of the tokenized input data stream against the reference pattern on a byte-by-byte basis. For example, the portion of the tokenized input data stream may be a tokenized input data quadword (e.g., 16 bytes of the tokenized input data stream). In this example, the processing element can compare the first byte (or another small segment) of the tokenized input data quadword with a prefix of the reference pattern. The prefix of the reference pattern may be the first byte (or a corresponding small segment) of the reference pattern. If the first byte of the tokenized input data quadword matches the prefix of the reference pattern, the processing element can compare the remainder of the tokenized input data quadword with the body of the reference pattern. The body of the reference pattern may be the remainder of the reference pattern (that does not include the prefix of the reference pattern). If the remainder of the tokenized input data quadword matches the body of the reference pattern, the processing element can determine that the tokenized input data quadword includes the reference pattern and can indicate a pattern match. For example, the processing element may indicate that the tokenized input data quadword includes sensitive information.

However, if the prefix of the tokenized input data quadword does not match the prefix of the reference pattern, the processing element may not compare the remainder of the tokenized input data quadword with the body of the reference pattern. Instead, the processing element may determine that the tokenized input data quadword does not match the prefix of the reference pattern. The processing element may then compare the tokenized input data quadword against the prefix of the next reference pattern. If the prefix of the tokenized input data quadword does not match the prefix of any of the reference patterns, the processing element may select the next tokenized input data quadword and compare the prefix of the next tokenized input data quadword against the prefix of the reference pattern. The next tokenized input data quadword may be selected by updating a sliding window based on the stride of the sliding window. For example, if the prefix or the body of any reference pattern did not match a first tokenized input data quadword including bytes 1-16, the processing element may determine whether the prefix or the body of any reference pattern matches a second tokenized input data quadword including bytes 2-17.

For example, the reference pattern represented by Exp. 2a and Exp. 2b may be used to detect passport information in an input data stream. In the reference pattern, the first 10 digits represent the passport number, the next characters are a 3-alpha country code, or a 2-alpha country code followed by '<' symbol, the next six digits represent the date of birth (YYMMDD), and finally a digit followed by 1-character gender (M/F).

(d)ddddddddddaa<u>a</u>ddddddddM                Exp. 2a (d)ddddddddddaa<u>a</u>ddddddddF                Exp. 2b In Exp. 2a and 2b, 'd' indicates a digit/numeric token and is represented by 0x88; 'a' indicates an alpha token and is represented by 0x90; '<u>a</u>' indicates an alpha token or a specific symbol token (e.g., '<') and is represented by 0x94. In one example, the first byte of the reference pattern may not be taken into consideration, the prefix of the reference pattern may be the next four bytes of the reference pattern, and the body of the reference pattern may be the remaining 16 bytes of the reference pattern. The prefix and the body of the reference pattern are represented by Exp. 3a and 3b, respectively.

Prefix: *dddd*=(0*x*88888888)                Exp. 3a

Body: *dddddaaaddddddddM*=(0*x*88888888
   0*x*88909094 0*x*88888888 0*x*8888884D*)    Exp. 3b In one example, the input data stream may be represented by Exp. 4a and the tokenized input data stream may be represented by Exp. 4b John Doe, *PPN*:1234567890*USA*9010230*M*0112358132134558914423        Exp. 4a 0*xEFE*8*EE*80 ... 0*x*32333435 ... 0*xF*5*F*3*E*139 ... 0*x*323330*ED* ...    Exp. 4b
 ('*ohn*') ...    ('2345') ...    ('*USA*9') ...    ('230*M*')

When the tokenized input data to be analyzed is '1234567890USA9010230' the prefix of the reference pattern matches at '1234' but the body of the reference pattern does not match the remainder of the tokenized input data. The sliding window is updated and the next tokenized input data is selected as '234567890USA9010230M'. For the next tokenized input data, the prefix of the reference pattern matches at '2345' and the body of the reference pattern matches the remainder of the tokenized input data at '67890USA9010230M'.

As will be appreciated by one skilled in the art, aspects of the present inventive subject matter may be embodied as a system, method, and/or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in a computer readable storage medium (or media) having computer readable program instructions embodied thereon.

Furthermore, aspects of the present inventive subject matter may be a system, a method, and/or a computer program product. The computer program product may include a computer readable storage medium (or media) having computer readable program instructions thereon for causing a processor to carry out aspects of the present inventive subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
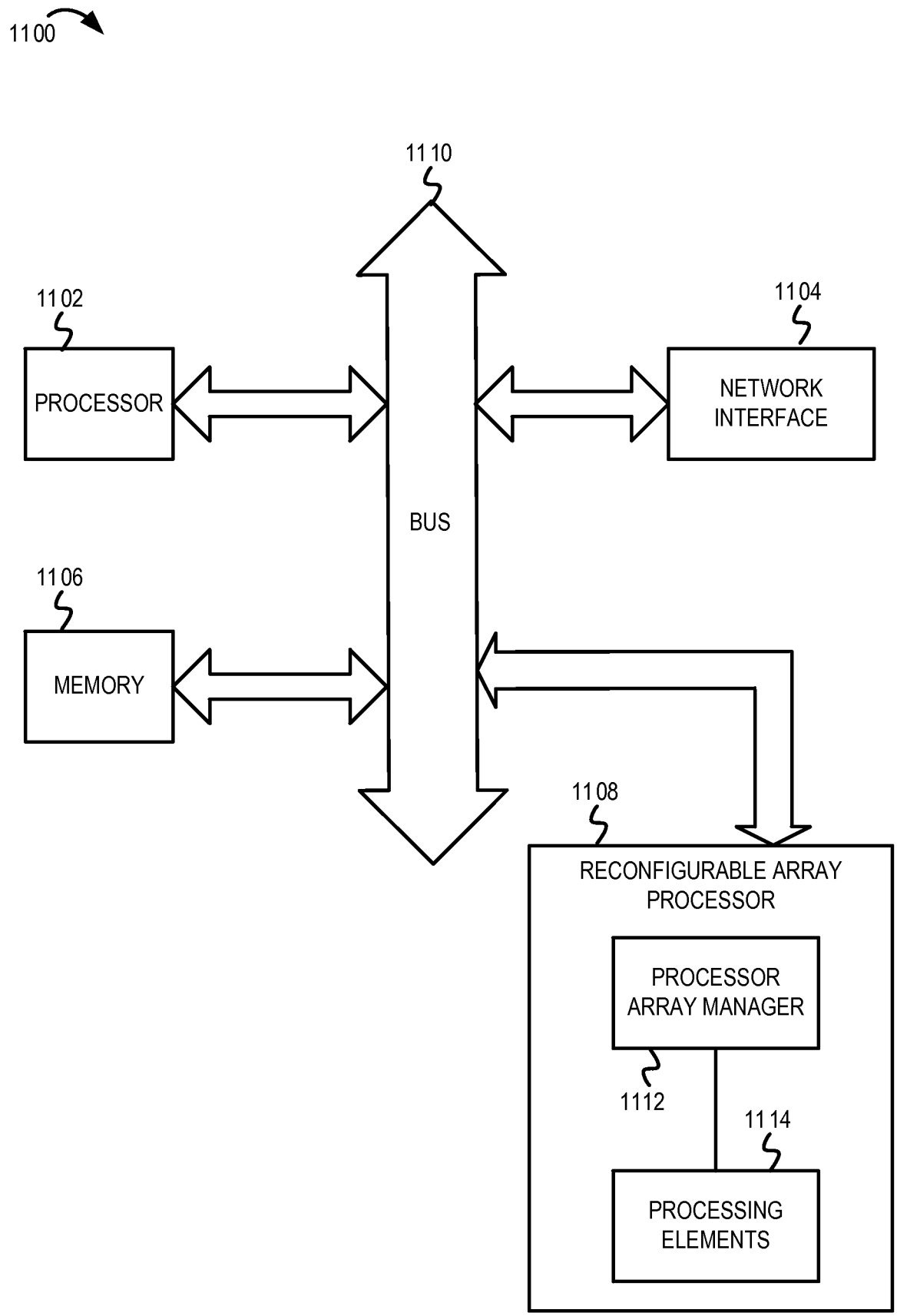
FIG. 11 is a system diagram of an example electronic device including a mechanism for pattern matching using a reconfigurable array processor according to an embodiment of the disclosure.

FIG. 11 depicts an example electronic device 1100 including a mechanism for pattern matching using a reconfigurable array processor according to an embodiment of the disclosure. The electronic device 1100 includes a processor 1102 (possibly including multiple processors, multiple cores, multiple nodes, and/or implementing multi-threading, etc.). The electronic device 1100 includes memory 1106. The memory 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1100 also includes a bus 1110 (e.g., PCI, ISA, PCI-Express, HyperTransport®, InfiniBand®, NuBus, etc.), a network interface 1104 (e.g., an ATM interface, an Ethernet interface, a Frame Relay interface, SONET interface, wireless interface, etc.), and a storage device(s) (e.g., optical storage, magnetic storage, etc.) (not depicted). The processor 1102, the memory 1106, and the network interfaces 1104 may be coupled to the bus 1110.

The electronic device 1100 also includes a reconfigurable array processor 1108. The reconfigurable array processor 1108 includes a processor array manager 1112 coupled with processing elements 1114. The reconfigurable array processor 1108 can implement functionality for determining whether an input data stream matches one or more reference patterns as described above with reference to FIGS. 1-10. Specifically, the processor array manager 1112 can generate a tokenized input data stream from the input data stream and provide different portions of the tokenized input data stream to each of the processing element 1114. Each processing element can compare the corresponding portion of the tokenized input data stream against one or more reference patterns. Each processing element can generate an intermediate result that indicates whether the corresponding portion of the tokenized input data stream matches a reference pattern. The processor array manager 1112 can receive the intermediate result from each processing element and can combine the intermediate results to form a final result. The final result can indicate whether the input data stream matches any of the reference patterns. The reconfigurable array processor 1108 can be implemented in any combination of software, hardware, or both. Any one of these functionalities may be partially (or entirely) implemented in hardware and/or on the processor 1102. For example, the functionality may be implemented with a system-on-a-chip (SoC), an application specific integrated circuit (ASIC), in logic implemented in the processor 1102, in a co-processor on a peripheral device or card, etc. Further, realizations may include fewer or additional components not illustrated in FIG. 11 (e.g., video cards, audio cards, additional network interfaces, peripheral devices, etc.). For example, in addition to the processor 1102 coupled with the bus 1110, the communication module 708 may comprise at least one additional processor. Although illustrated as being coupled to the bus 1110, the memory 1106 may be coupled to the processor 1102. In some embodiments, the memory 1106 may implement functionality to implement the embodiments described above. The memory 1106 may include one or more functionalities that facilitate implementation of operations for pattern matching using a reconfigurable array processor.

While the embodiments are described with reference to various implementations and exploitations, it will be understood that these embodiments are illustrative and that the scope of the inventive subject matter is not limited to them. In general, techniques for pattern matching using a reconfigurable array processor as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   providing at least one token reference pattern to each of a plurality of processing elements of a reconfigurable array processor, the token reference pattern including a plurality of tokens, each token representing a portion of the token reference pattern;
   translating, by a manager of the reconfigurable array processor, an input data stream into a tokenized data stream based on an encoding methodology, wherein the tokenized data stream includes tokens indicating a data type of an associated segment of the input data stream without indicating a data value of the associated segment of the input data stream;
   providing a different portion of the tokenized data stream to each of the plurality of processing elements of the reconfigurable array processor;
   receiving an intermediate result from each processing element based, at least in part, on the processing element comparing the different portion of the tokenized data stream against the token reference pattern provided to the processing element, wherein the intermediate result indicates whether the different portion of the tokenized data stream matches the token reference pattern; and
   combining the intermediate results received from each of the plurality of processing elements to yield a final result that indicates whether the input data stream includes the token reference pattern.

2. The method of claim 1, wherein said generating the tokenized data stream comprises:
   comparing segments of the input data stream with a plurality of tokens to generate the tokenized data stream from the input data stream.

3. The method of claim 2, wherein the plurality of tokens is determined based on at least one of the input data stream and an application of the reconfigurable array processor.

4. The method of claim 1, wherein said generating the tokenized data stream comprises:
   determining that a first segment of the input data stream matches a first token of a plurality of tokens; and
   replacing the first segment of the input data stream with a predetermined output associated with the first token to generate the tokenized data stream.

5. The method of claim 1, wherein said combining the intermediate results comprises:
   for each of the plurality of processing elements that provides an intermediate result;
      selecting a segment of the intermediate result generated by the processing element; and
      combining the segments of the intermediate results to yield the final result.

6. The method of claim 1, wherein, for each of the plurality of processing elements;
   the intermediate result includes a first value when the portion of the tokenized data stream matches at least one token reference pattern of a plurality of token reference patterns, and
   the intermediate result includes a second value when the portion of the input data stream does not match any token reference pattern of the plurality of token reference patterns.

7. The method of claim 1, wherein said providing a different portion of the tokenized data stream to each of the plurality of processing elements comprises:
   for each of the plurality of processing elements;
      selecting a portion of the tokenized data stream based, at least in part, on a sliding window associated with the manager;
      providing the portion of the tokenized data stream to the processing element; and
      updating the sliding window based, at least in part, on a stride of the sliding window.

8. The method of claim 7, wherein for each of the plurality of processing elements, the portion of the tokenized data stream provided to the processing element is based, at least in part, on a length of the sliding window.

9. The method of claim 1, further comprising:
   for each of the plurality of processing elements, providing a control signal to the processing element in response to receiving, at the manager, the intermediate result generated by the processing element, wherein the control signal indicates that the processing element should execute pattern matching operations on a next portion of the tokenized data stream.

10. The method of claim 1, further comprising:
    determining that a subset of the plurality of processing elements are part of a processing element cluster; and
    organizing the intermediate result received from each of the subset of the plurality of processing elements in a predetermined sequence for subsequent processing.

11. The method of claim 1, further comprising:
    receiving the intermediate result at the manager from a first processing element of the plurality of processing elements;
    determining whether the intermediate result was received from all of the plurality of processing elements; and
    waiting, at the manager, to receive the intermediate result from a remainder of the plurality of processing elements in response to determining that the intermediate result was not received from all of the plurality of processing elements, wherein said combining the intermediate results is in response to determining that the intermediate result was received from all of the plurality of processing elements.

12. The method of claim 1, further comprising:
    configuring interconnections between at least one pair of processing elements of the plurality of processing elements for pattern matching at the reconfigurable array processor.

13. The method of claim 1, further comprising:
disabling at least one component of a first processing element of the plurality of processing elements to configure the first processing element to execute operations for pattern matching.

14. The method of claim 1, wherein the translating of an input data stream into a tokenized data stream includes assigning a token to each individual byte of the input data stream.

15. The method of claim 1, wherein the translating of an input data stream into a tokenized data stream includes assigning a token to groups of bytes that include at least two bytes of the input data stream.

16. The method of claim 1, wherein the translating of an input data stream into a tokenized data stream includes selecting, based upon contents of the input data stream, types of tokens to assign to bytes within the input data stream.

17. The method of claim 1, wherein the translating of an input data stream into a tokenized data stream includes selecting sets of tokens to assign to bytes within the input data stream based upon contents of the input data stream.

18. The method of claim 1, wherein the translating of an input data stream into a tokenized data stream includes selecting a token to assign to a specific character within the input data stream.

19. The method of claim 1, wherein the translating of an input data stream into a tokenized data stream includes selecting a token to assign to a specific type of character within the input data stream.

20. The method of claim 1, wherein tokens within the token reference pattern represent the position of patterns of characters within the token reference pattern.

* * * * *